United States Patent [19]

Houser et al.

[11] 4,135,907

[45] * Jan. 23, 1979

[54] PULP TREE BARK TREATMENT

[75] Inventors: John E. Houser, Marion; Ralph J. Kramer, Delaware, both of Ohio

[73] Assignee: Aerotherm, Inc., Delaware, Ohio

[*] Notice: The portion of the term of this patent subsequent to Jan. 16, 1996, has been disclaimed.

[21] Appl. No.: 797,610

[22] Filed: May 17, 1977

[51] Int. Cl.² .................. C05F 11/08; C05F 11/00
[52] U.S. Cl. .................................. 71/9; 71/23; 195/127
[58] Field of Search .............. 71/9, 21, 22, 23, 25; 23/259.1, 290.5; 259/102, 40; 214/83.2

[56] References Cited

U.S. PATENT DOCUMENTS

| | | | |
|---|---|---|---|
| 2,107,682 | 2/1938 | Wall | 214/83.2 |
| 3,114,622 | 12/1963 | Hardy | 71/9 |
| 3,140,921 | 7/1964 | Barrow | 71/23 |
| 3,357,812 | 12/1967 | Snell | 71/23 |
| 3,561,943 | 2/1971 | Gay | 71/25 |
| 4,046,551 | 9/1977 | Anderson | 71/10 |
| 4,060,390 | 11/1977 | Shimizu et al. | 71/9 |

FOREIGN PATENT DOCUMENTS

2123042  6/1970  France ............................ 71/9

Primary Examiner—S. Leon Bashore
Assistant Examiner—Chris Konkol
Attorney, Agent, or Firm—Sidney W. Millard

[57] ABSTRACT

Bulk tree bark removed as a preparatory procedure to pulping wood for use in the paper industry is converted into a useful humus by-product through the use of a system and method wherein the bark is delivered to a receiving station in an aerobicly untreated state. This material then is adjusted to optimize the nitrogen content thereof through the addition of nitrogenous material. Additionally the pH level thereof as well as the moisture level is optimized through the utilization of a mixing arrangement which agitates and retains the materials over a predetermined time interval. The material then is transferred to a digester apparatus where it undergoes aerobic thermophilic phase digestion under the influence of induced atmospheric air and agitation. Two digester arrangements are described. Following thermophilic digestion to derive a relatively low biochemical oxygen demand value for the material, it is removed to a curing region where, under environmental atmospheric conditions, is retained for an interval sufficient to effect a mesophilic phase digestion. Following this curing procedure, the material is transferred to a receiving station for disposition as a valuable by-product.

24 Claims, 19 Drawing Figures

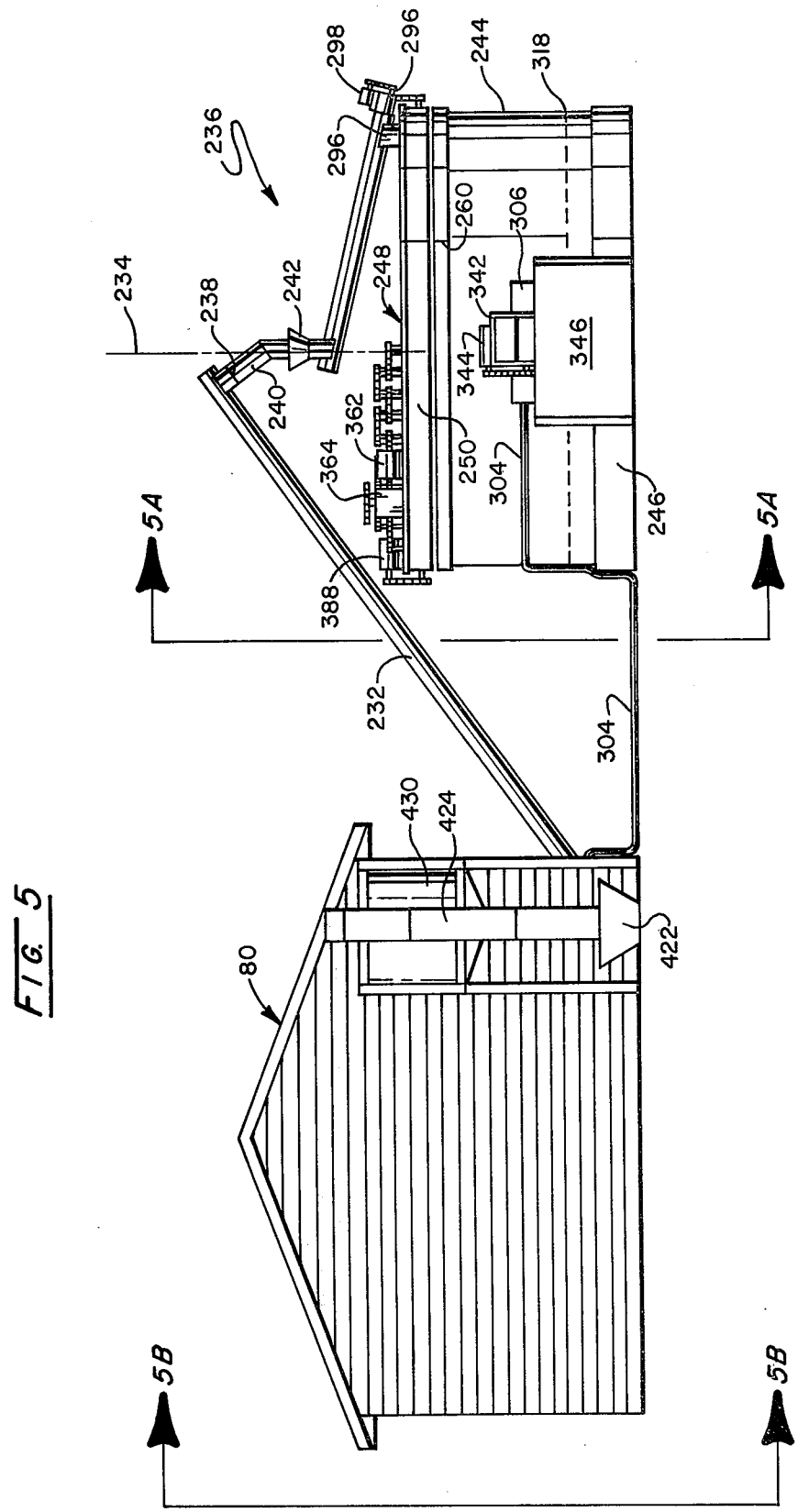

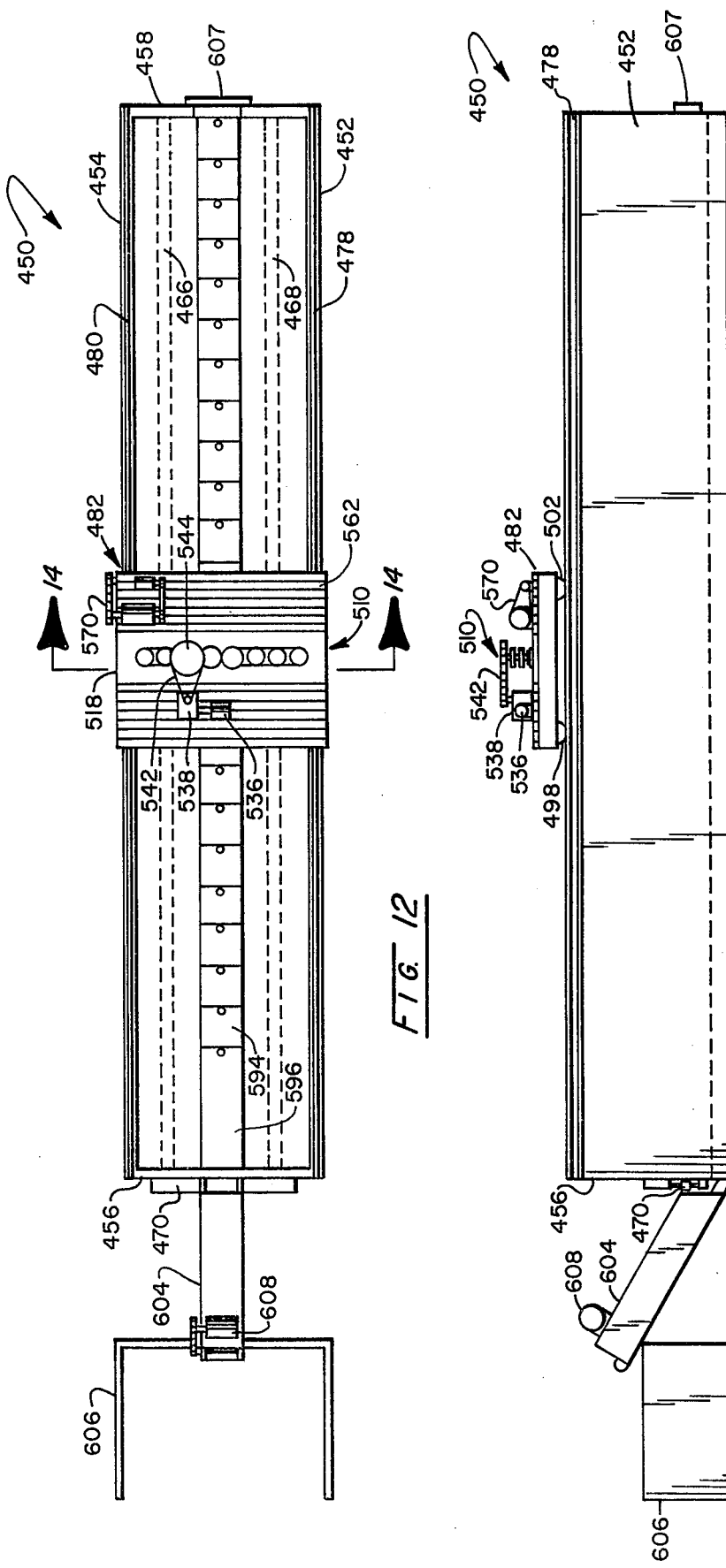

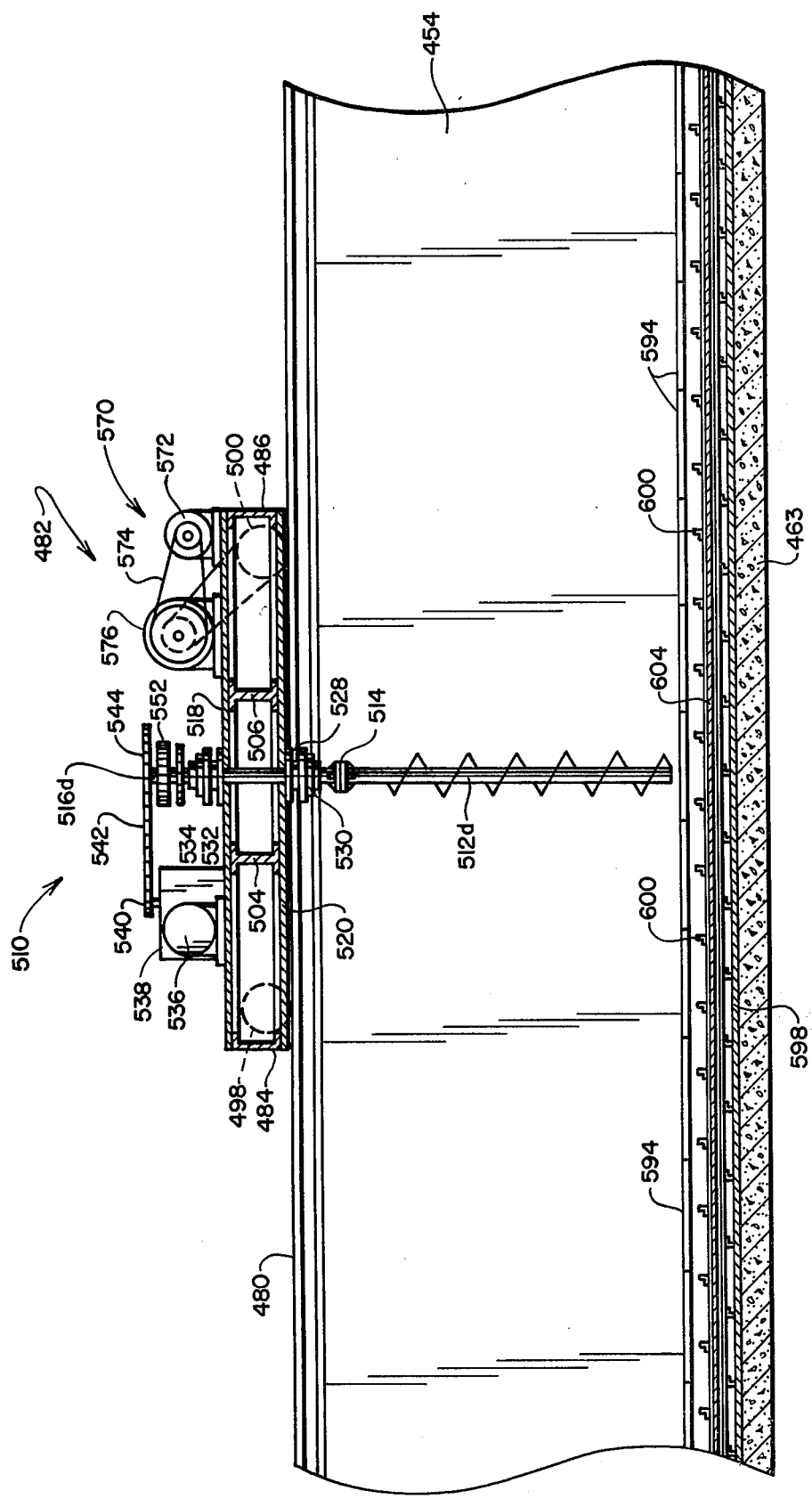

PULP TREE BARK TREATMENT

BACKGROUND

The paper manufacturing industry basically functions to procure a variety of generally fibrous cellulosic materials, physically as well as chemically break-down or alter such materials to a desired fibrous or pulp type consistency and reconstitute them in a dry web-like, form. For the most part, the raw material from which the pulp is generated is derived from tree wood, an estimated five million or more cords of such wood being harvested per annum in the United States. A broad variety of tree species are harvested for the purpose of pulp production, the procedure of harvesting generally providing for the cutting of tree logs into four foot lengths prior to the movement thereof into storage regions situate at mill facilities. Additionally the wood chip by-products of lumber manufacture are utilized as a raw material input to the paper forming process.

As a preliminary processing step, the harvested pulp wood logs are mechanically ground to form a preliminary pulp material, however, as a prelude to this procedure the bark portions thereof, i.e. that organic material extending outwardly from the cambium is removed. This "woodbarking" step is required inasmuch as bark has little fiber value, tends to overly consume the chemicals utilized in later processing steps and creates dirty pulp conditions. Generally, the bark represents from about twelve to twenty-five percent of the volume of rough wood, consequently, its disposition following removal from the pulp tree logs represents an industrial disposal problem. In some installations, the bark by-product is used in part as a fuel for later processing procedures, the fuel value of the material being about 9,000 BTUs per pound dry weight.

Conventionally, woodbarking is carried utilizing relatively elongate barking drums through which the logs are fed, debarking action taking place as the logs tumble and rub against one another and against the sides of the drums on their transit therethrough. The loosened bark drops through spaces or slots formed in the drum whereupon it is collected on a conveyor for removal to temporary storage. At some facilities, the bark is further shredded to a relatively uniform consistency.

Subsequent to the initial grinding procedures developing pulp wood chips and the like, a variety of manufacturing procedures treating the raw materials are employed. These procedures involve a number of unit operations such as gas absorption, evaporation, extraction and filtration to evolve a pulp product for delivery to the paper making stage. The pulp product is introduced to a stock preparation process where it is treated mechanically and, in some instances, chemically, by the use of additives, whereupon it is accepted for forming into a final paper web. As is well known, the multi-stage process generates a substantial waste representing a severe industrial disposal requirement. The waste ultimately exiting from the manufacturing process generally may be described as an effluent carrying very short fibrous matter, clay and other materials and having about a 95% moisture content. Usually, the effluent is dewatered through the use of settling tanks and/or centrifuges to accumulate as a sludge having about a 69% water content. Disposal of this sludge typically is carried out using land fill techniques.

From the foregoing it may be observed that typical paper mill installations will generate two principal waste products, bark resulting from woodbarking stages and sludge. While the sludge component is disposable through land fill arrangements, a less than desirable procedure, some uses have been found for the bark materials. Over the relatively recent past, industrial interest has been generated in conversion of the bark to a humus type byproduct useful in the horticultural industry. Generally the bark is transported to an available field whereupon it is deposited in windrows and subjected to periodic turning by typical farm implements over a given interval of time for example, about sixty days. During this interval, the bark is caused to undergo a fungal mold action, following which a period ensues wherein decomposition of the bark predominantly is carried out by bacteria active in a mesophilic phase at temperatures, for example, below 45°–50° C. The resultant material has been found useful and valuable, for example, as a potting soil as well as a conditioner for garden soils. The windrow form of treatment to achieve biodegradation of the material is considered somewhat crude, a reliable, uniform product not being guaranteed. Further, such technique is labor intensive, inefficient in and of itself and, additionally, not integrated with the overall industrial paper making process.

SUMMARY

The present invention is addressed to an improved system and method for treating pulp tree bark removed as a preparatory procedure to pulping. Characterized in exhibiting a capability for efficiently and economically converting the bark to a compost by-product of reliable uniformity and quality, the system incorporates components which initially prepare the bark to achieve a highly efficient aerobic thermophilic phase digestion. Upon being introduced into the system, the bark is progressively mixed in a pug mill with metered quanities of aqueous liquid and nitrogenous material. Such mixing with these additives serves to derive a highly biodegradable material, the uniformly distributed moisture and nitrogen content thereof being selected for the most efficient digestion. Additionally, a metered quantity of alkaline material such as agricultural grade lime may be admixed at the mixing stage to adjust the pH of the material toward chemical neutrality. The latter adjustment serves to enhance the fixation of the nitrogen content within the ultimately derived compost material.

As another aspect and feature of the invention, the sludge effluent which is typically encountered in pulping and paper manufacturing may be utilized as the aqueous liquid input to the system and method of the invention. Such sludge generally is present as a water borne mixture of very fine fibrous cellulosic material and clay present in somewhat equal amounts. Whereas such material normally is dried and disposed of in land fill procedures or the like, with the present invention a portion of the liquid waste may be utilized in the development of a valuable by-product.

As another feature and object, the inventive system and method utilizes a pug mill for the noted mixing stage, which mill may be present as an elongate screw-paddle type mixer, the bark and additives being deposited at one end of the mixer and gradually mixed by the device to exit therefrom in continuous fashion for delivery to a digestor facility.

As another object, the invention incorporates a digestive step efficiently carrying out aerobic thermophilic digestion of the moisture and nitrogen content adjusted biodegradable material on a continuous basis. Subsequent to the thermophilic digestion of the material over about a five to seven day period, the materials are then cured for an interval of fifteen to thirty days under conventional atmospheric environmental conditions during which a mesophilic phase digestion is carried out. In this curing stage, a further breakdown of the cellulosic material of the bark is witnessed to enhance the quality of the material by lowering the carbon to nitrogen ratio thereof as well as by lowering of the moisture content of the material. No odors or other objectionable characteristics are present during the curing stage by virtue of the earlier induced thermophilic digestion. Additionally, the material is ideally sterile in consequence of the higher temperature thermophilic phase digestion, thereby exibiting an enhanced quality desired in the horticultural and agricultural industries.

The digestive apparatus of the system is characterized by an advantageous arrangement providing an assurance that all particles submitted thereto are subjected to a thermophilic phase biodegradation at corresponding sterilizing temperature ranges. Utilizing a receptacle of generally cylindrical surface configuration, the digestion apparatus incorporates atmospheric air supplying conduits of predetermined pattern positioned within the bottom thereof beneath a diffusion material such as coarse aggregate. The latter provides for further diffusing of air issuing from the pattern of conduits. Waste material is deposited along the surface of the receptacle through an opening in the roof thereof and auger-type agitators extend into the material and are rotated in a manner effecting a gradual movement of the bark toward the center of the apparatus as it is subjective to progressive to thermophilic digestion. The fully digested bark, now a compost material, is removed from the lower portion of the apparatus through a relatively small opening or orifice within the supporting diffuser material.

As another aspect, the method of the invention utilizes, as an alternative arrangement, a step wherein the final region of induced air within the digester is operated at enhanced air flow levels to lower the moisture content of the material as it is removed from the digester. With such an arrangement, the material will exhibit a proper moisture content for immediate utilization as a compost by-product.

Another object of the invention is to provide an alternative digester apparatus for the system representing a relatively lower initial capital batch system investment. The apparatus includes a digester receptacle arrangement wherein bulk biodegradable materials are retained between elongate, spaced parallel walls of given height extending upwardly from a supporting base to a top portion. As in the earlier embodiment, a source of atmospheric air under pressure is coupled with a conduit arrangement formed within the lower portion of the receptacle. This conduit is formed in a simple pattern extending generally parallel to the spaced walls of the receptacle and includes a plurality of spaced outlets for providing an aerobic influence over substantially all of the biodegradable material deposited within the receptacle. A diffuser arrangement, which may be formed of coarse aggregate or the like, is positioned in the bottom of the receptacle between the two parallel walls and over the conduit arrangement. The upward surface of this diffuser arrangement supports the biodegradable material at the lower level of the receptacle. A carriage extending between the top portions of the walls is provided which is movable along the lengthwise extent of the receptacle and this carriage supports an agitator arrangement. As before, the agitator arrangement includes a plurality of auger type agitators supported from the carriage and extending downwardly to a position just above the upwardly disposed surface of the aggregate or diffuser surface. Thus arranged, the carriage moves back and forth along the extent of the receptacle to provide agitation while atmospheric air under pressure is introduced through the diffuser arrangement. This receptacle is fed with initial biodegradable material by conventional motorized implements such as front end loaders operating from positions wherein the material may be dumped over the edge of the supporting walls. Instead of a front end loader its filling can be mechanized by employing a belt conveyor with a moveable belt plow to fill the digester. The belt conveyor would be located above the centerline of the digester with enough clearance to allow passage of its agitating device. A bulk processing procedure being utilized, subsequent to the lowering of the biochemical oxygen demand of the material within the receptacle, a conveyor extending lengthwise along the receptacle is activated. This conveyor is positioned beneath the upward surface of the diffuser material and is covered with moveable plates which may be adjusted by an operator to define an access opening for the material to fall into for removal by the conveyor. By adjusting the covering plates, the access opening may be progressively maneuvered along the length of the receptacle to carry out removal of substantially the entire bulk quantity of the material treated therein.

Other objects of the invention, will, in part, be obvious and will, in part, appear hereinafter. The invention, accordingly, comprises the system and process possessing the construction, steps and procedures, combination of elements and arrangement of parts which are exemplified in the following detailed disclosure.

For a fuller understanding of the nature and objects of the invention, reference should be had to the following detailed description taken in connection with the accompanying drawings.

BRIEF DESCRIPTION OF THE DRAWINGS

FIG. 12 is a plan view of another embodiment of a digester facility according to the invention;

FIG. 13 is a side view of the facility of FIG. 12;

FIG. 16 is a partial sectional view taken through the plane 16—16 of FIG. 15.

DETAILED DESCRIPTION

Figure 1:
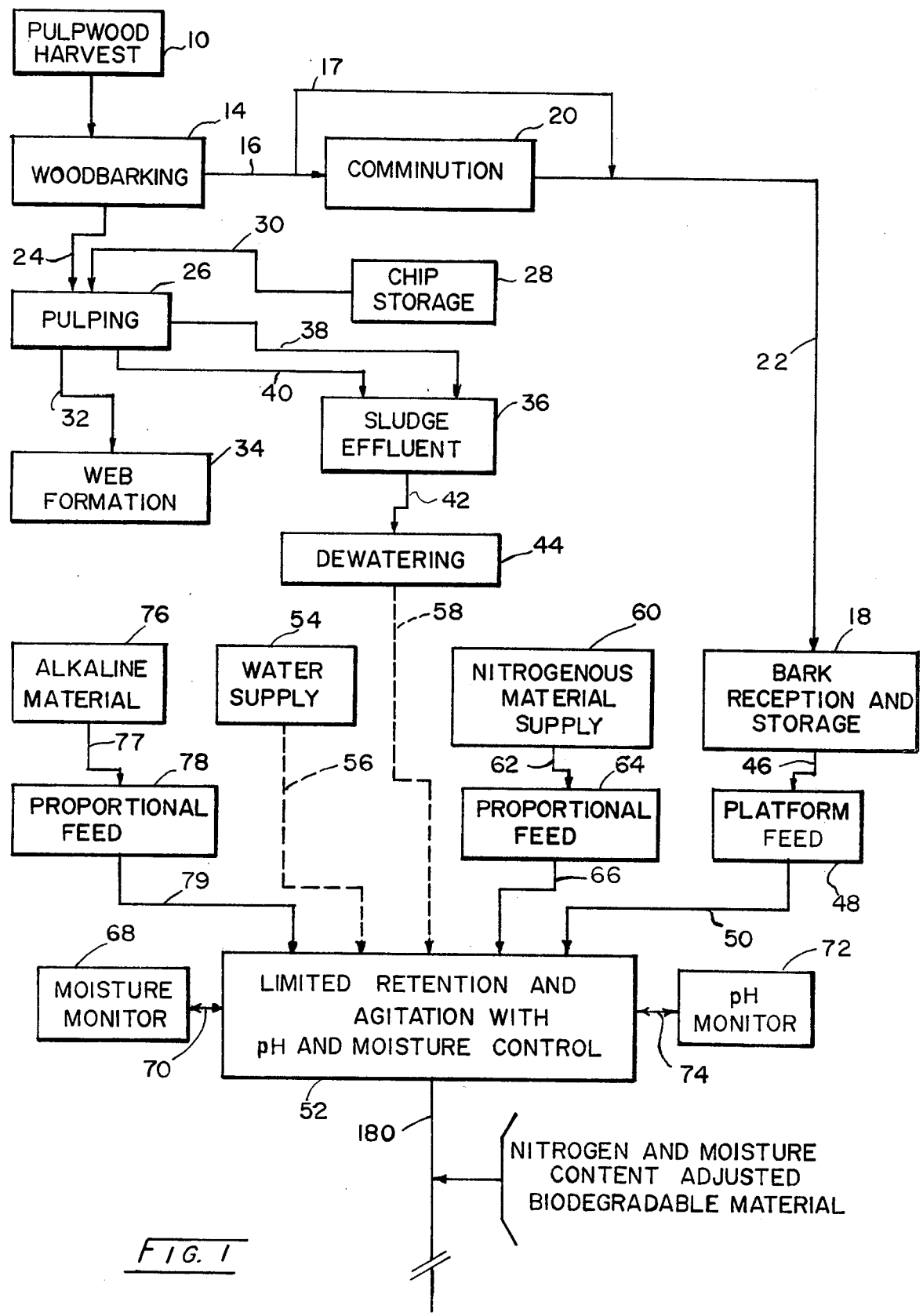
FIGS. 1 and 1A are block, flow type diagrams showing the system and method of the invention, the uppermost portion of FIG. 1A being intended to continue from the lowermost portion of FIG. 1.

As indicated above, the system of the instant invention is ideally suited for operation as a function integrated within an overall pulp and/or paper production facility. As the description unfolds, it will become apparent that the relative cost for providing the highly efficient treatment can be maintained at very reasonable levels while a very high degree of quality control over the resultant treated by-product is readily maintained. While the relative physical locations of paper plant facilities are not revealed in the drawings, it will be apparent that the structures representing the instant system readily are locatable in efficient proximity to a paper manufacturing facility. This location is selected not only on the basis of available space but also on the relative distance to a woodbarking facility and in one embodiment, location in the proximity of that woodbarking facility as well as a sludge effluent development stage. To facilitate the discussion to follow, the bark treating and sludge utilization arrangement is set forth in a block, flow-logic diagrammatic fashion as well as in particularized drawings and description of the physical facility incorporating the subject system and method.

Looking to FIG. 1, the noted block logic arrangement of the system is revealed, the drawing further incorporating in generalized fashion pertinent functions of the paper production industry. In this regard, the harvesting of pulp wood is represented at block 10. For providing this function, pulp wood trees of predesignated size range are removed and transported in lengths of approximately four feet to a woodbarking station, as is represented at block 12. Generally fashioned as very large rotating drums incorporating slots and the like, the bark of the logs is removed and transported by conveyors as represented by line 16 either directly to a bark reception and storage facility as represented at block 18, through lines 16, 17 and 18, or to a comminution stage or the like which functions to shred the bark to more manageable or practical particle size. The latter stage is represented at block 20. Should the comminution stage be utilized, the shredded or comminuted bark then is conveyed, as indicated by line 22, to reception and storage stage 18. As indicated above, the bark removed is that organic material extending outwardly from the cambium of the log and represents from about twelve to twenty-five percent of the volume of the rough wood. Generally, the bark exhibits a relatively low moisture content of about thirty-five to forty percent by weight. In a typical facility, approximately 150 tons of the bark is generated in a days' operation.

Following woodbarking procedures as at 14, the logs are conveyed, as represented by line 24, to a pulping facility, as represented at block 26. Such facilities are extensive, involving the wide variety of unit processes including, for example, an initial grinding stage followed by an involved chemical processing of the wood chips developed therefrom. Currently, the pulping operation additionally utilizes the by-products of lumber forming facilities, which by-products are transported and stored at a chip storage area represented at block 28. From the storage region as at 28, the wood chips are selectively conveyed, as represented by line 30, to the pulping facility 26. A detailed discourse describing the pulping process is provided in the text: "Pulp and Paper Science and Technology", Volume 1, 1962 published by McGraw-Hill Book Company, New York, New York. The output product of the pulping procedures is directed, as represented by line 32, to stock preparation and a paper or web formation facility, represented by block 34. In the final stages of such facilities, liquid stock is deposited for example, from a sluice-type retainer onto the moving wire web of fourdrinier machine from which point the final paper web utlimately is derived. Pulping facility 26 and web formation facility 34 generate a white water waste which may incorporate a wide variety of ingredients. However, this effluent will contain very fine cellulosic fibers, clay and a variety of chemical materials not recovered and is water borne to the extent that, as noted above, the resultant sludge exhibits a moisture or water content of about 95% by weight. This sludge effluent is represented at block 36, the effluent input thereto being represented by lines 38 and 40 extending respectively from blocks 26 and 34. Generally the sludge effluent 36 is dewatered, for instance by centifuging or the like to reduce the water content thereof to about 70%. Accordingly, the effluent is represented in the drawing as being conveyed to a dewatering stage 44 by line 42.

The bark treating system includes the bark reception and storage function 18 from which the bark is transported, as represented by line 46, to a suitable controlling feed arrangement represented by block 48 for instance a platform feeder which provides metered delivery, as represented by line 50, to a limited retention and agitation stage represented at block 52. This stage also derives an appropriate moisture content and control over the materials retained and mixed therewithin. Also leading to function or stage 52 is a moisture input which may be derived from a conventional water supply, as represented at block 54 and shown leading to function 52 through dashed line 56. Alternately or in addition to the moisture generated from supply 54, necessary liquid addition can be provided from the dewatered sludge function 44, as represented line 58. With the latter arrangement a valuable use is made of a portion of the sludge wastes which otherwise would contribute to the disposal problem associated therewith. Generally, the utilization of the sludge in place of conventional water is dictated by the relative proximity of the dewatering stage to the bark-treatment facility. A third input to retention and agitation or mixing function 52 is represented at block 60 as a nitrogenous material supply. This material is conveyed, as represented by line 62, through a proportional feeder, represented by block 64, to retention and agitation function 52, as represented at line 66. The nitrogenous material supplies are inserted within the process in order to enhance the aerobic decomposition of the bark material. In this regard, the bark conventionally exhibits a relatively high carbon to nitrogen ratio of about thirty to one by weight, which is generally inadequate for efficient digester performance. The materials deriving necessary nitrogen are those which can contribute that element to the aerobic digestive process and are relatively economical with respect to the value of the ultimate humus by-product type product generated by the instant system. Materials readily used for this purpose are, for example, amonium sulfate, amonium nitrate, various of the urea-type fertilizer products and the like.

Retention and agitation function 52 also is shown associated with a moisture content monitor function represented by block 68 and line 70. Accordingly, function 52 serves to derive a biodegradable material, the nitrogen and moisture content of which is adjusted for optimized aerobic digestion. The function additionally provides for an adequately uniform consistency of this material to assure an ultimately reliable and consistent final product. Depending upon the relative size of the facility provided, the feed of bark as well as nitrogenous material and moisture may be automated. However, for a broad range of typical facilities, the monitoring function as at 68 as well as the feed function 48 and moisture input through lines 56 or 58 can be carried out manually.

Figure 2:
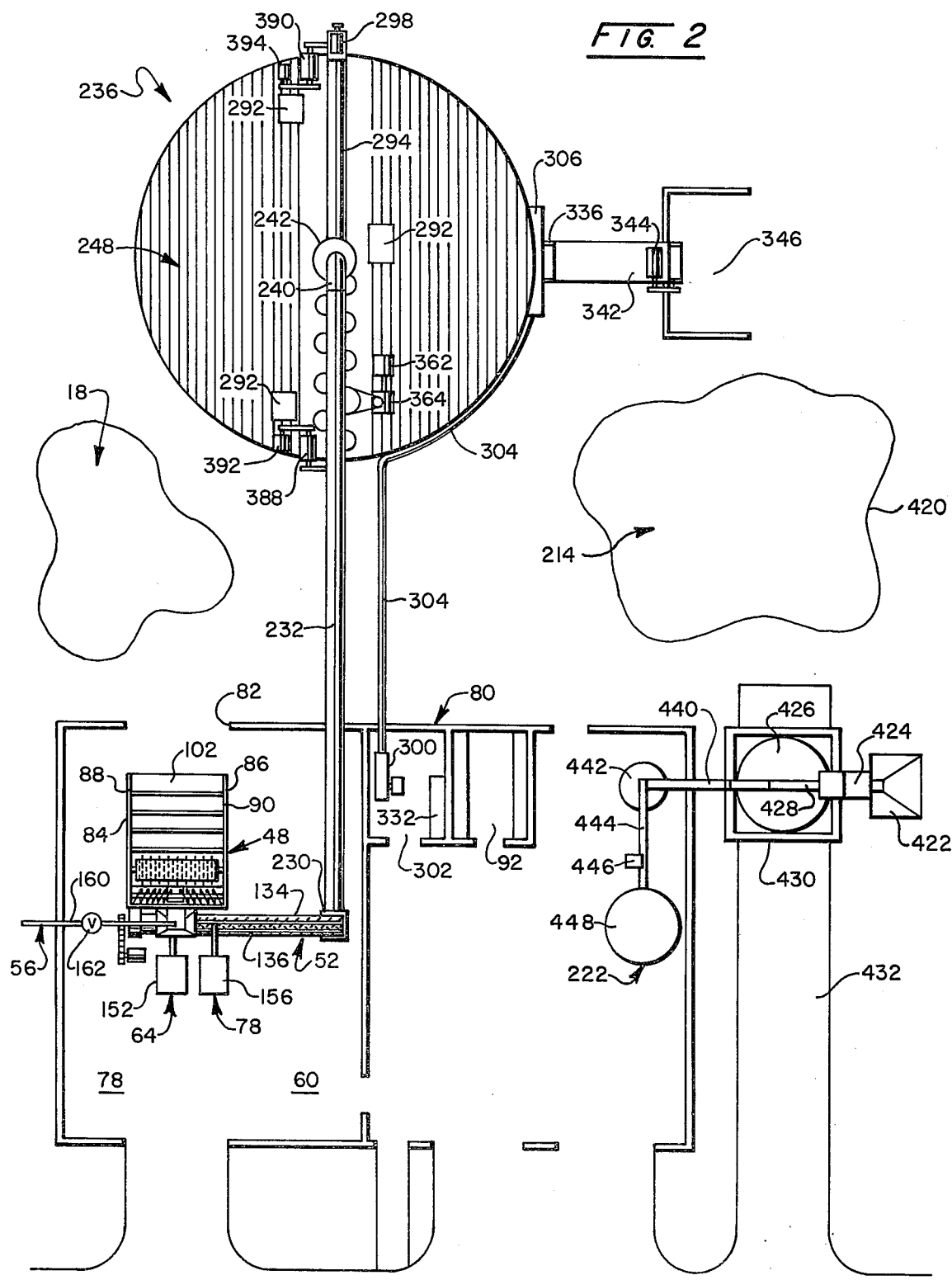
FIG. 2 is a plan view of a facility incorporating the system and method of the invention and suited for a pulp and paper production facility.
Figure 3:
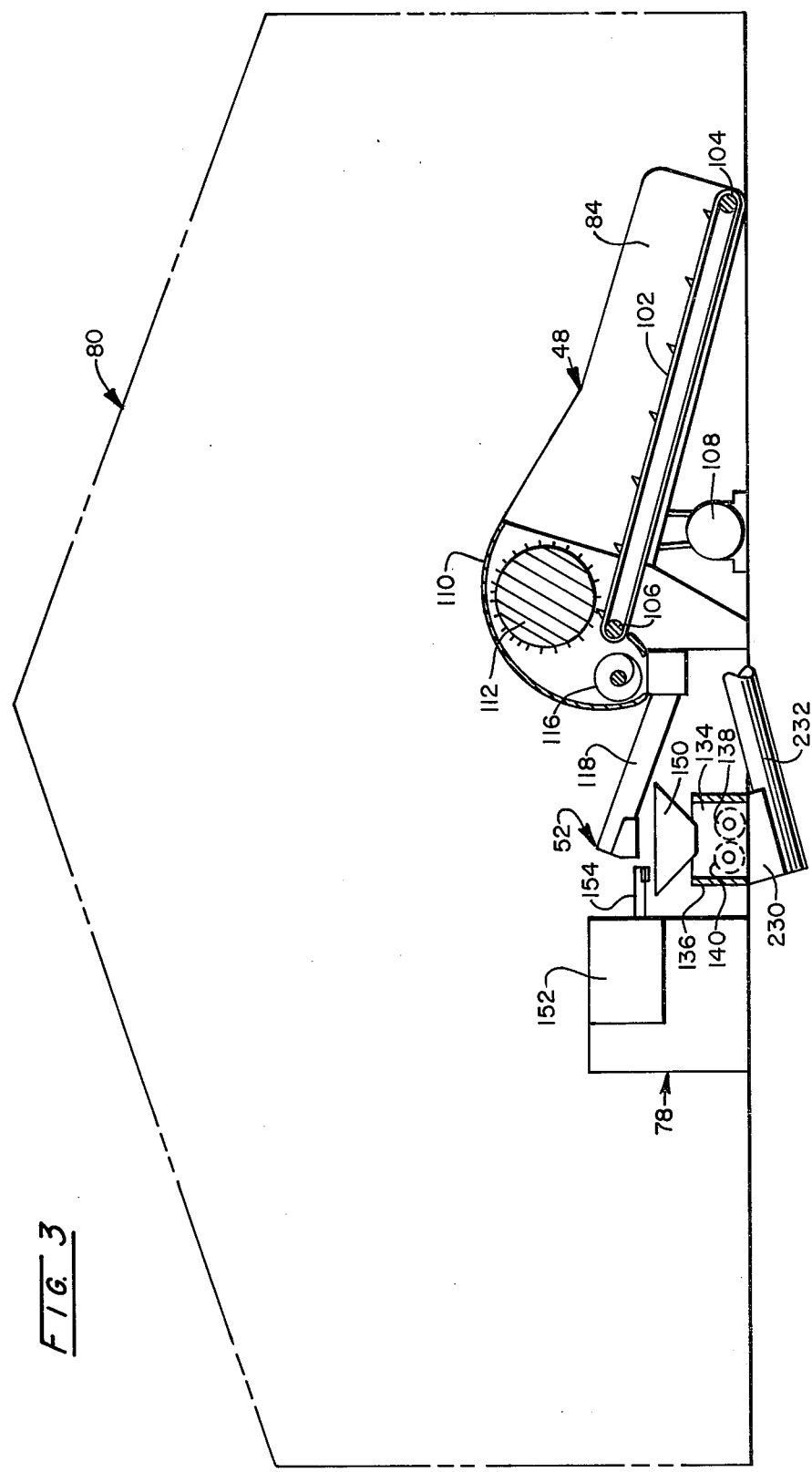
FIG. 3 is a partial side elevational view of the facility of FIG. 2.
Figure 4:
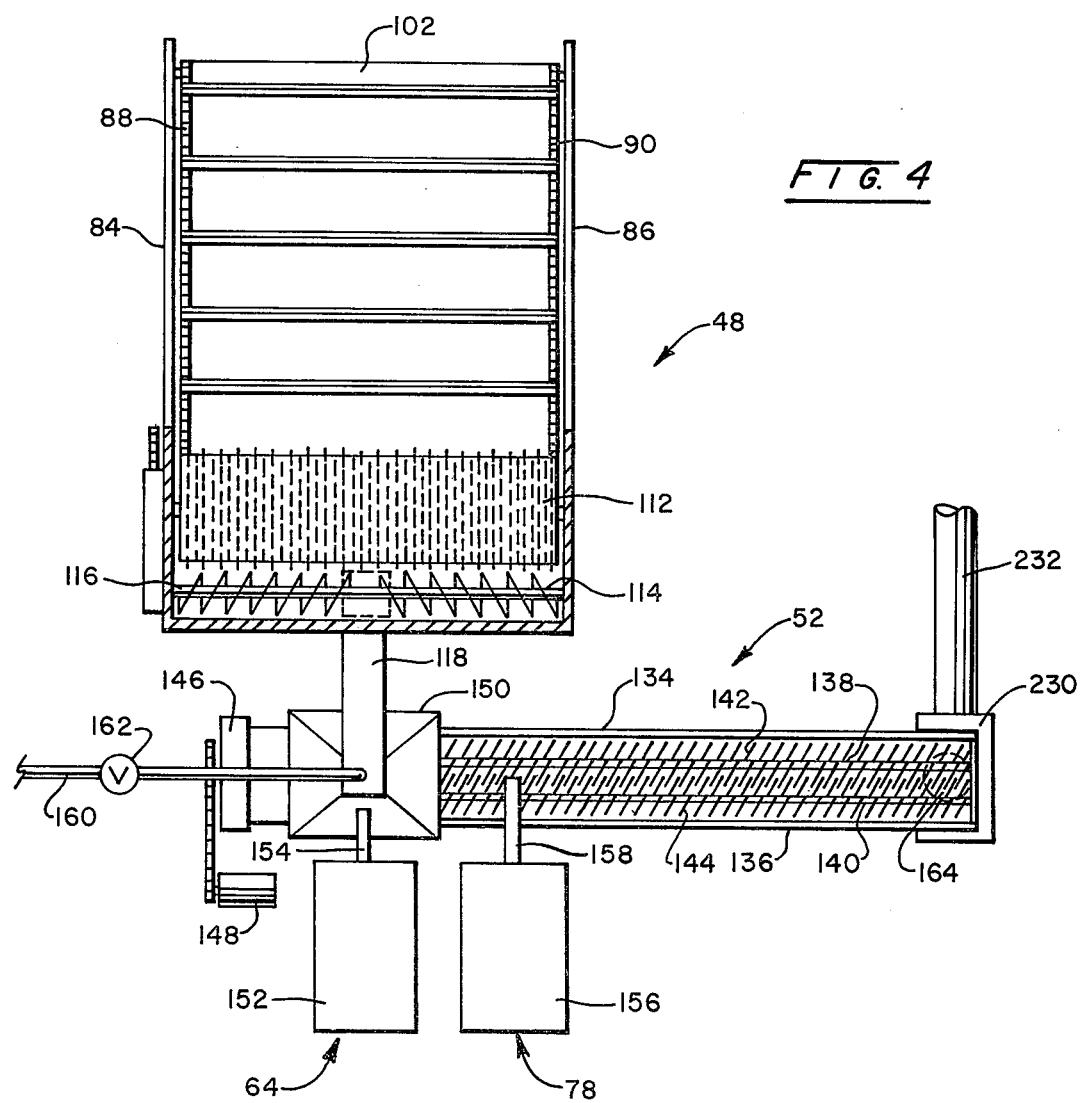
FIG. 4 is a partial plane view of components of the system represented in FIG. 2.

Referring additionally to FIG. 2, a facility incorporating the above-delineated functions or stages of bark treatment is revealed. The facility includes a conventional industrial building represented generally at 80 within which several of the noted functions are incorporated and which serves to protect them from atmospheric elements and the like. Where appropriate, the functions above-described are again represented in the FIGS. 2 et seq. in general fashion by the same numeration. For example, the bark platform feed function discussed in conjunction with block 48 is represented within one room of building 80, access to that room being represented at doorway 82. In conventional installations, the bark is transported from a storage region by front end loaders or the like through door 82 to be deposited upon one end of a platform feeder 84. Referring additionally to FIGS. 3 and 4, feeder 84 is formed incorporating a receiving bin 86 having sloping side walls 88 and 90. These walls direct particulate bark onto a moving platform formed of a plurality of parallel slats associated to define a relatively broad moveable surface. The slats are interconnected and are driven by oppositely disposed endless chains between drive rolls 104 and 106, the latter roll being powered from a motor and gear reduction arrangement shown at 108. Positioned for rotation over platform 102 and formed within an upper cowl 110 of platform feeder 84 is a beater drum 112 driven by a connection, not shown, from gear reduction 108. Beater 112 served to effect an initial leveling of materials carried from platform 102 and generally may be fashioned as a cylindrical component having a plurality of tines extending therefrom which contact the upward surface of the bark moving on the platform. Drum 112 provides an initial crude distribution of the bark materials. As the materials exit from platform 102 through beater drum 112, they are deposited along the input portions of a pair of coaxially disposed right and left hand screw flight conveyers 114 and 116. Conveyers 114 and 116 move the material transversely toward a centrally disposed exit chute 118 through which the bark falls at an appropriately controlled flow rate. Platform feeders as at 84 are readily commercially available, for instance being produced and marketed by Heil Co., Milwaukee, Wisconsin.

In a typical paper mill installation, the bark input to feeder 84 would be about 150 tons per day based on a five day working week. As noted above, the bark evidences about a thirty-five to forty percent moisture content by weight, which content is less than that considered appropriate for achieving optimized or most efficient aerobic digestion. Additionally, the carbon-to-nitrogen ratio exhibited by the bark generally is relatively high to support aerobic digestion, being in the range of about thirty-to-one by weight for the bark deposited at receiving bin 86. Another aspect of the bark by-product resides in its exhibiting a relatively low pH level, for example in the acid range of about three to four. In accordance with the instant invention and as discussed in connection with FIG. 1, a moisture monitoring arrangement is provided as represented at block 68 and, additionally, a pH monitoring feature is provided as represented at function block 72, while corresponding proportional feed of an alkaline neutralizer material is represented at blocks 76 and 78 and line 79. All of the above inputs to the system are admixed and blended for a limited interval in accordance with the function described at limited retention and agitation block 52. A screw-type paddle mixer 132 is used for the latter operation. Paddle mixer 132, sometimes referred to as a "pug-mill" is shown in FIGS. 2 and 4 having its top removed for clarity and is of typical design comprising a generally box-shaped housing the elongate sides of which are shown at 134 and 136. Extending along the length of this housing are two centrally disposed shafts 138 and 140 each of which carries a plurality of serially disposed paddles, certain of which are represented respectively at 142 and 144. Shafts 138 and 140 are driven in a counter-rotative sense through a reduction gear arrangement shown generally at 146 which, in turn, is coupled by a belt to a motor 148. Paddle mixers are available on the market, for example from Link Belt Co., Chicago, Illinois. Access to the rotating paddles of the mixer is provided through a hopper portion thereof 150, one section of which is disposed to receive bark from exit chute 118 of platform feeder 84.

Nitrogenous material proportional feeding function 64 is provided by a proportional feeder shown at 152 having a built-in hopper and electric motor drive for delivering the material through an output conduit 154 to the hopper portion 150 of paddle mixer 132. Disposed adjacent to proportional feeder 152 is an identical feeder 156 having an output conduit 158 extending to a position next to conduit 154 as it communicates with hopper portion 150. Feeder 156 functions to provide alkaline neutralizing material as described in connection with block 78 of FIG. 1. Generally, this material is provided as a conventional agricultural grade lime. The rates of discharge for feeder devices 152 and 156 as well as platform feeder 84 are established by the operator through controls integrated therewith. With respect to the operation of feeder 156, the pH of the entering bark is monitored as described at function block 72 to derive an appropriate neutralizing effect. Moisture is inserted into the hopper area 150 of paddle mixer 132 via a conduit 160 and valve 162. Water is admixed in an amount sufficient to derive a uniform moisture content of between about fifty to sixty percent by weight at the output of mixer 132. As noted earlier in connection with function blocks 36 and 44, this moisture content may be derived as the effluent or liquid borne waste of the paper making facility. Inasmuch as the white water effluent of such facilities generally incorporates biodegradable materials, use of some of the ultimate and nonrecycled white water liquids can be made at this juncture of the system. The amount of such liquid introduced to the instant mixing stage is, of course, dependent upon the relative moisture content of the sludge or effluent itself. Proportional feeders as at 152 and 156 are readily available in the market, for example, being marketed under the trade designation "BIF" by General Signal Corporation of West Warwick, Rhode Island.

During the operation of the paddle mixer 132, the bark, liquid, alkaline material and nitrogenous material are joined in hopper area 150 whereupon they are progressively mixed by the counter-rotating paddles as at 142 and 144 and gradually maneuvered toward an output port 164 (FIG. 4). By virtue of the mixing activity imparted from the dual series of paddles within the mixer and in consequence of the period of retention established by the length of the mixer, the material exiting therefrom at port 164 is optimized for moisture content, nitrogen content and acid condition. In order to enhance or render highly efficient the aerobic digestion of the material, it is important that the above mixing be thorough and evolve a highly consistent admixture. While pH levels as well as moisture levels may be automatically monitored and the above discussed controls automatically effected at proportional feeders 152 and 156, for typical installations, portable moisture as well as pH monitors may be utilized in carrying out appropriate adjustment for optimization of the mix. It may be observed that the consistency of shredded bark is ideal for purposes of aerobic digestion inasmuch as the void content of the finely mixed material, designated a "Nitrogen and Moisture Content Adjusted Biodegradable Material" is appropriate to interaction with the oxygen of atmospheric air utilized in the digestive process.

Figure 1A:
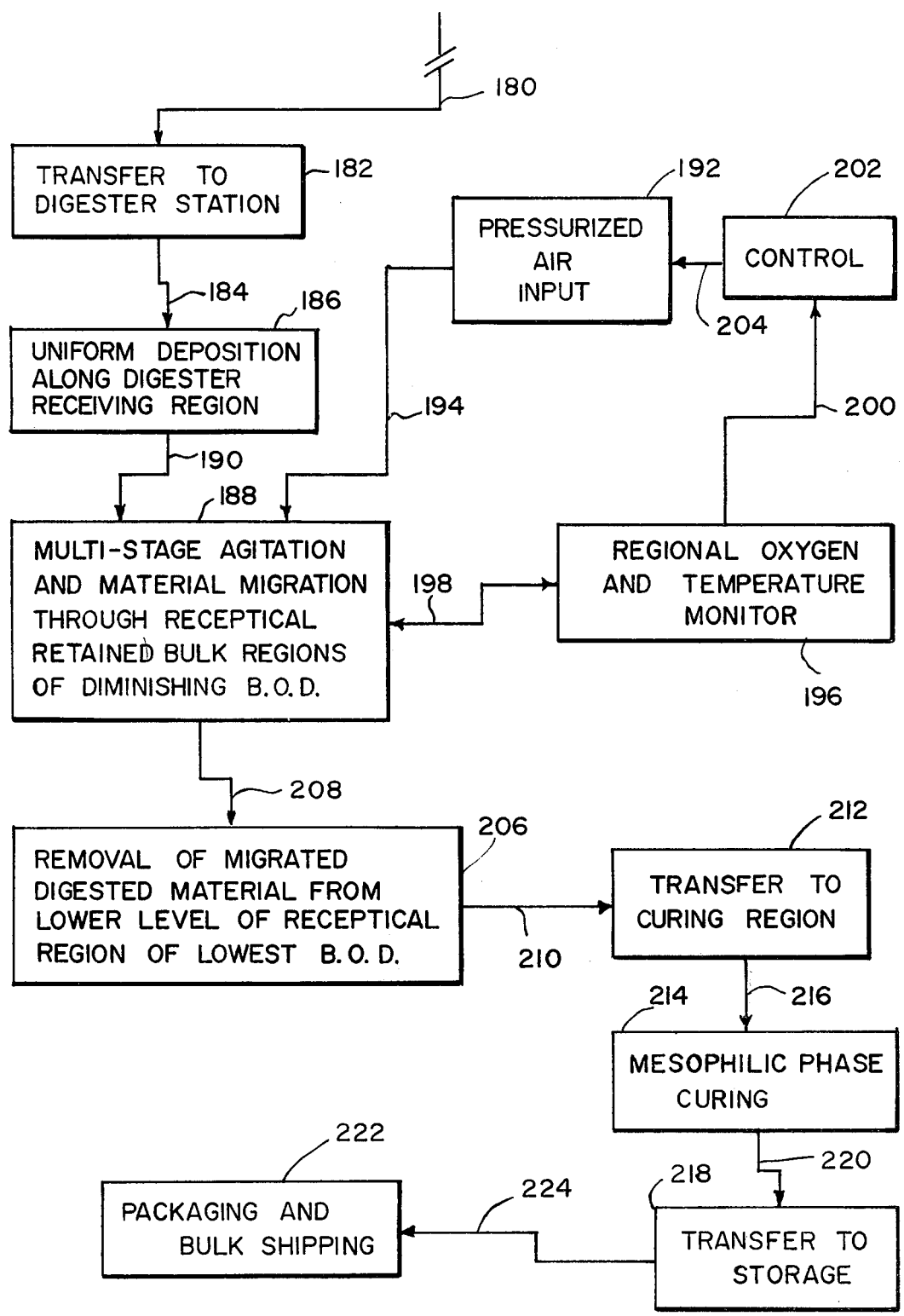

Looking to FIGS. 1 and 1A, a nitrogen and moisture content adjusted biodegradable material is shown being developed from function 52 at line 180 and then transferred to a digester station as represented at block 182. Upon being transferred, as represented at line 184 and block 186, the material is uniformly deposited along the receiving region of a digester. Upon such deposition, as revealed at block 188 and line 190, digestion is carried out in a multi-stage arrangement incorporating agitation of the material and consequent material migration through the receptacle retained bulk of the digester. As the particulate matter migrates, it moves through regions wherein it exhibits a progressively diminishing biochemical oxygen demand (B.O.D.) until an optimally treated material is derived. In the course of this migration and agitation of the material, oxygen laden air under pressure is introduced through the bulk thereof, as represented at block 192, and line 194. Additionally, regions within the digesting bulk or the processing receptable are monitored both for the oxygen content of the gas which is passed through the bulk as well as the temperature of the material itself. This regionally effected oxygen and temperature monitor is represented at block 196 and line 198. The outputs of the oxygen-temperature monitoring function are directed along line 200 for utilization by a control function represented at block 202. This function then reasserts a control through line 204 to the oxygen supply represented at pressurized air input block 192. The procedures for controlling thermophilic phase digesters have been described, for instance, reference is made to U.S. Pat. Nos. 3,010,801; 3,138,448 and 3,285,732 by Schulze. Following digestion, the material within the digester is removed from the lowest level of the digester receptacle, as indicated at block 206 and line 208, whereupon, as represented at line 210 and block 212, the material is transferred to a region reasonably close to the digester facility for purposes of curing it.

As the digested material is drawn from the digester function, the particles thereof will have migrated over an interval ranging from about five to seven days. Further, the particulate matter withdrawn will evidence about a forty to forty-five percent by weight moisture content and, assuming that the neutrality of the bulk mixture within the digester has been appropriately developed and maintained, the thermophilic phase digestion will have substantially broken down the cellulose content thereof and lowered its carbon-to-nitrogen ratio to improve the quality of the product. This product is sterile and valuable, however, a further curing stage for this type of digested product may readily be provided. For instance, the material can be stored in bulk and unprotected under typical environmental atmospheric conditions for about fifteen to thirty days during which storage it will undergo a form of mesophilic digestion to further lower the carbon-to-nitrogen ratio, for instance to about twenty-to-fifteen to one. Additionally, the moisture content of the material will be reduced, for instance to a desirable level of about twenty percent by weight. Mesophilic phase digestion generally takes place at relatively lower temperatures. The thermophilic digestion carried out in the digester facility itself operates at a more desirable higher temperature, for instance about 60°–65° C. a form of digestion substantially free of odor as well as one providing for the noted sterilization of the by-product. A further advantage in providing a curing stage for the instant system resides additionally in the break-down of the particulate matter being digested to a finer consistency in consequence of the attack on the remaining cellulose materials retained therein.

Comparing the instant process, for example, with the typical windrowing techniques utilized in the treatment of bark heretofore, the instant process requires about five to seven days for thermophilic digestion and, as an option, an additional fifteen to thirty days for curing. By comparison windrowing will require about sixty days under ideal conditions, is a labor intensive effort and the quality of the product, as noted above, is not as desirable as that now developed. Some arrangements in the prior art have utilized multi-phase procedures for controlling decomposition, however in the reverse of that now shown. For instance as disclosed in U.S. Pat. No. 2,820,703, municipal waste materials are caused to undergo a fungal mold action, following which a period wherein which decomposition is predominantly carried out in the mesophilic phase ensues. Generally following such a phase, maximum biodegradation is carried out in the thermophilic phase. These multi-phase techniques for municipal or large scale waste decomposition have been observed to exhibit numerous disadvantages including a requirement for somewhat more elaborate plant facilities, an accommodation to control pathogens and the like in the preliminary phases of digestion as well as to control objectionable odors and the like. Approaches to the manyfold problems associated with digestive-type installations are described in U.S. Pat. Nos. 3,523,012 and 3,114,622. Generally, the difficulties encountered in the development of systems heretofore proposed appear to have involved a failure of meeting the biochemical oxygen demand of the digestive process, failure to maintain necessary temperatures to achieve thermophilic phase decomposition as well as failure to derive a practical arrangement for assuring that all particles of the biodegradable waste material are fully treated in a practical manner within the process.

The mesophilic phase curing of the instant invention is represented in FIG. 1A at block 214 and associated with the transfer function 212 through lines 210 and 216. Following the fifteen to thirty day mesophilic phase curing procedure, the material is maneuvered, for instance by front end loaders, as is represented at block 218 and line 220 to a storage area whereupon, as represented at block 222 and line 224, the material is packaged for sale or maneuvered into truck loading hoppers and the like for bulk sale.

Figure 5A:
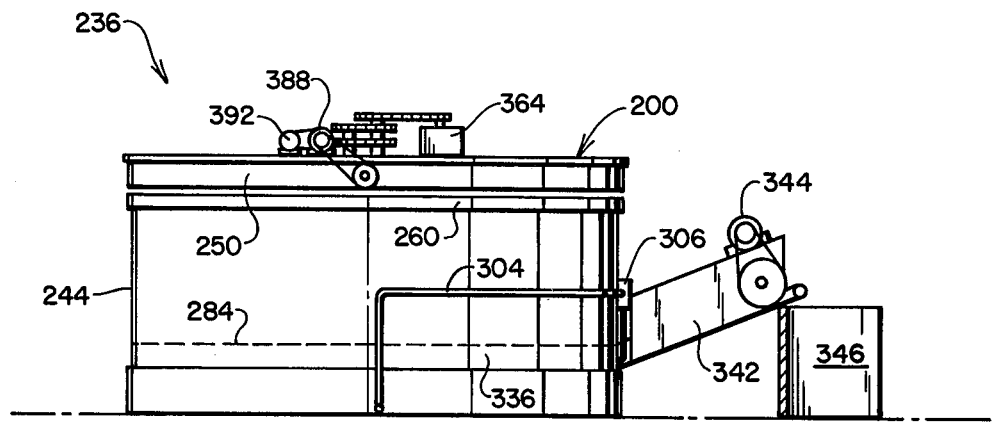
FIG. 5 is a side elevational view of portions of the facility of FIG. 2.
Figure 8:
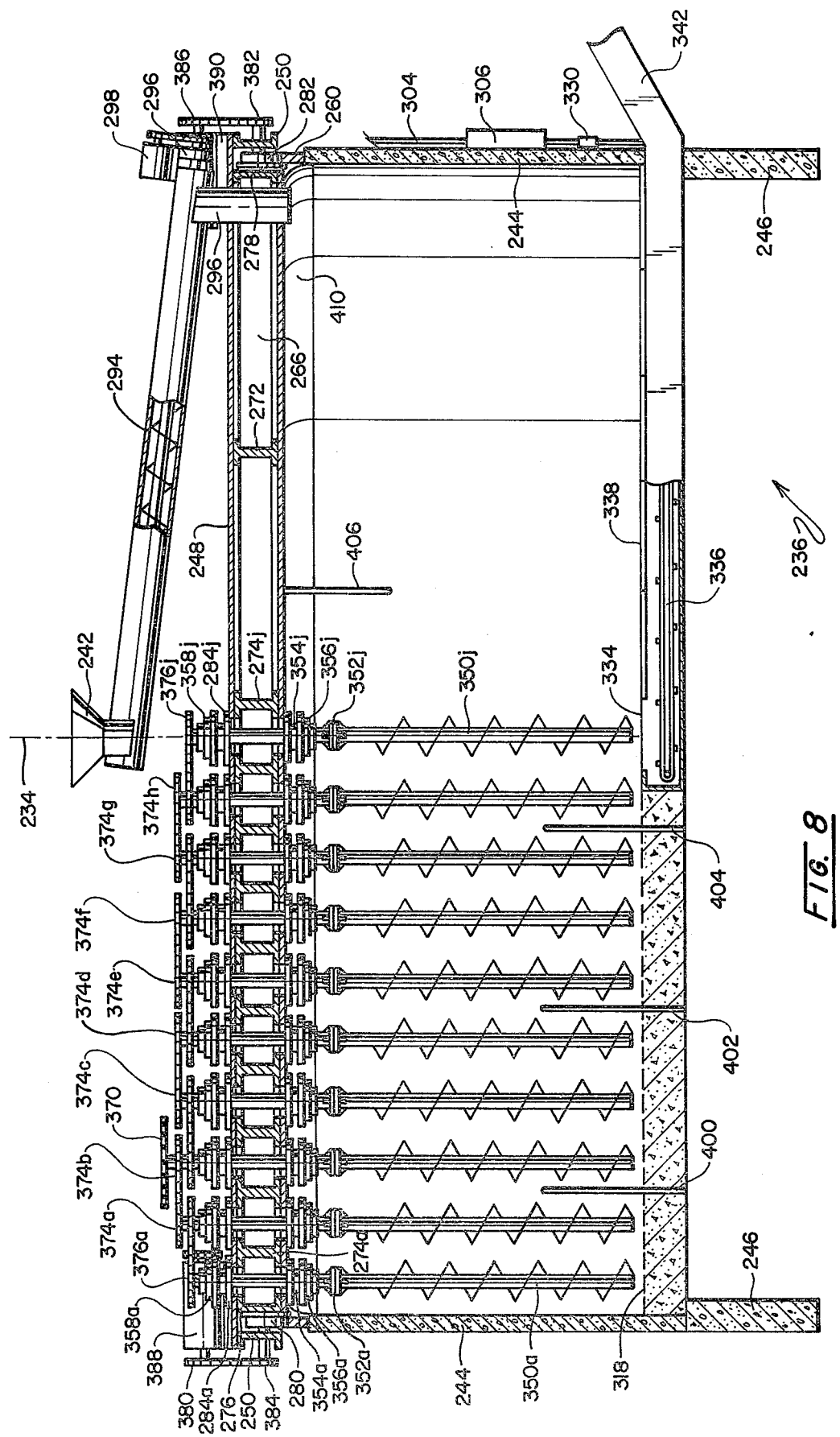
FIG. 8 is a partial sectional view of the digester apparatus shown in FIGS. 2, 5, 6 and 7.
Figure 9:
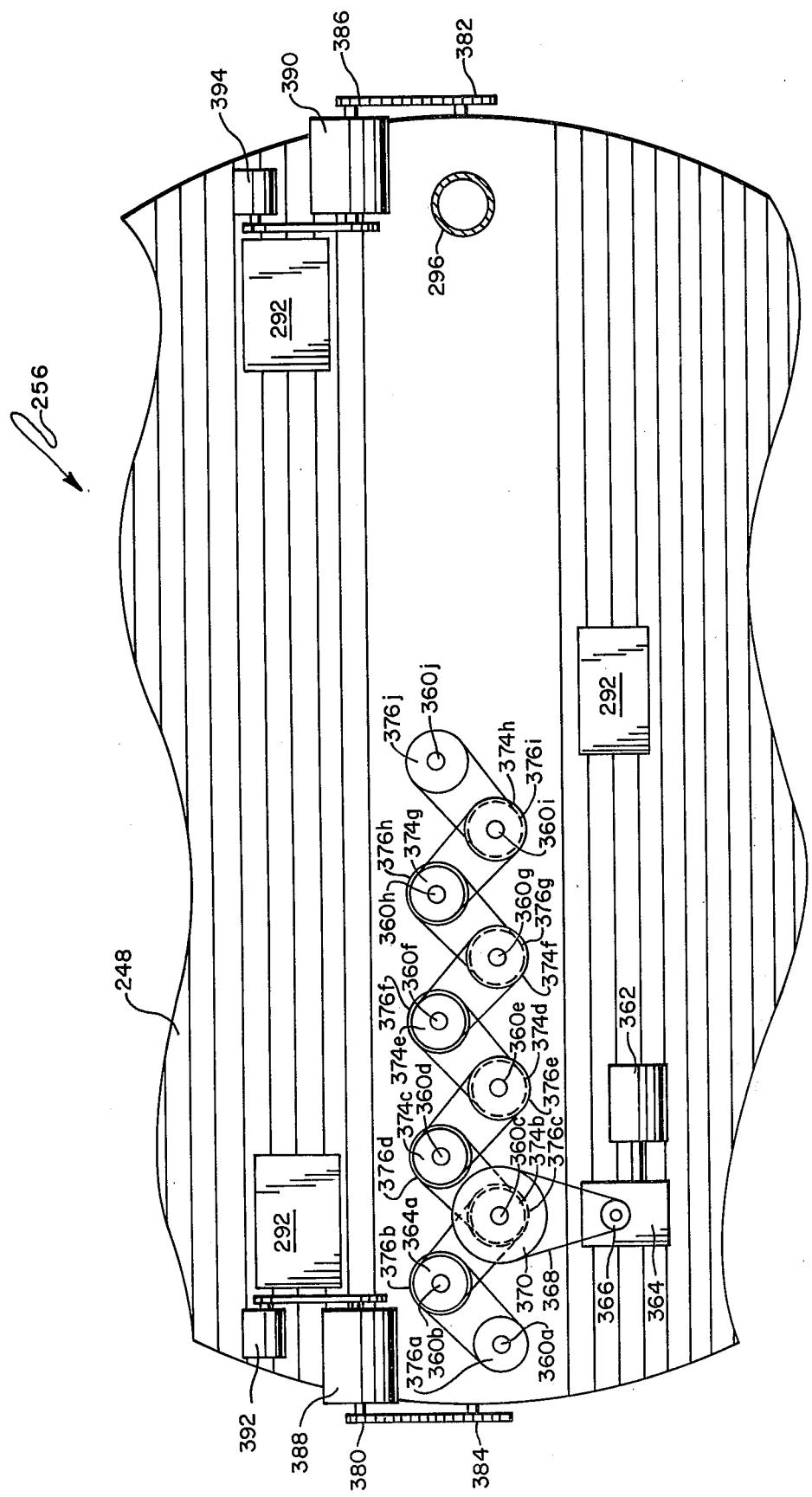
FIG. 9 is a top partial view of the apparatus of FIG. 8.

Looking to FIGS. 2, 3 and 4, nitrogen and moisture content adjusted biodegradable material exiting from mixing stage 52 is deposited within a hopper 230 from which it is transferred, for example via a screw-type conveyor 232, to a location elevated over the central axis 234 of a digester apparatus represented generally at 236. Of course, other forms of conveyor may be utilized for the instant purpose, a screw-type device being representative of those conventionally selected. As shown in FIGS. 5 and 8, the material exits from conveyor 232 at an output port 238 connected, in turn, to a lead conduit 240. Conduit 240 is oriented for the deposition of material passing therethrough into a hopper 242 symmetrically positioned about axis 234. The figures reveal that digester apparatus 236 comprises a receptacle formed having an outer wall 244 of generally cylindrical surface configuration which is supported by a cylindrical foundation or footing 246 fashioned of concrete or the like. Wall 244 may be formed of concrete either poured or in block form as well as from steel or the like and is connected with foundation 246 in conventional fashion.

Figure 11:
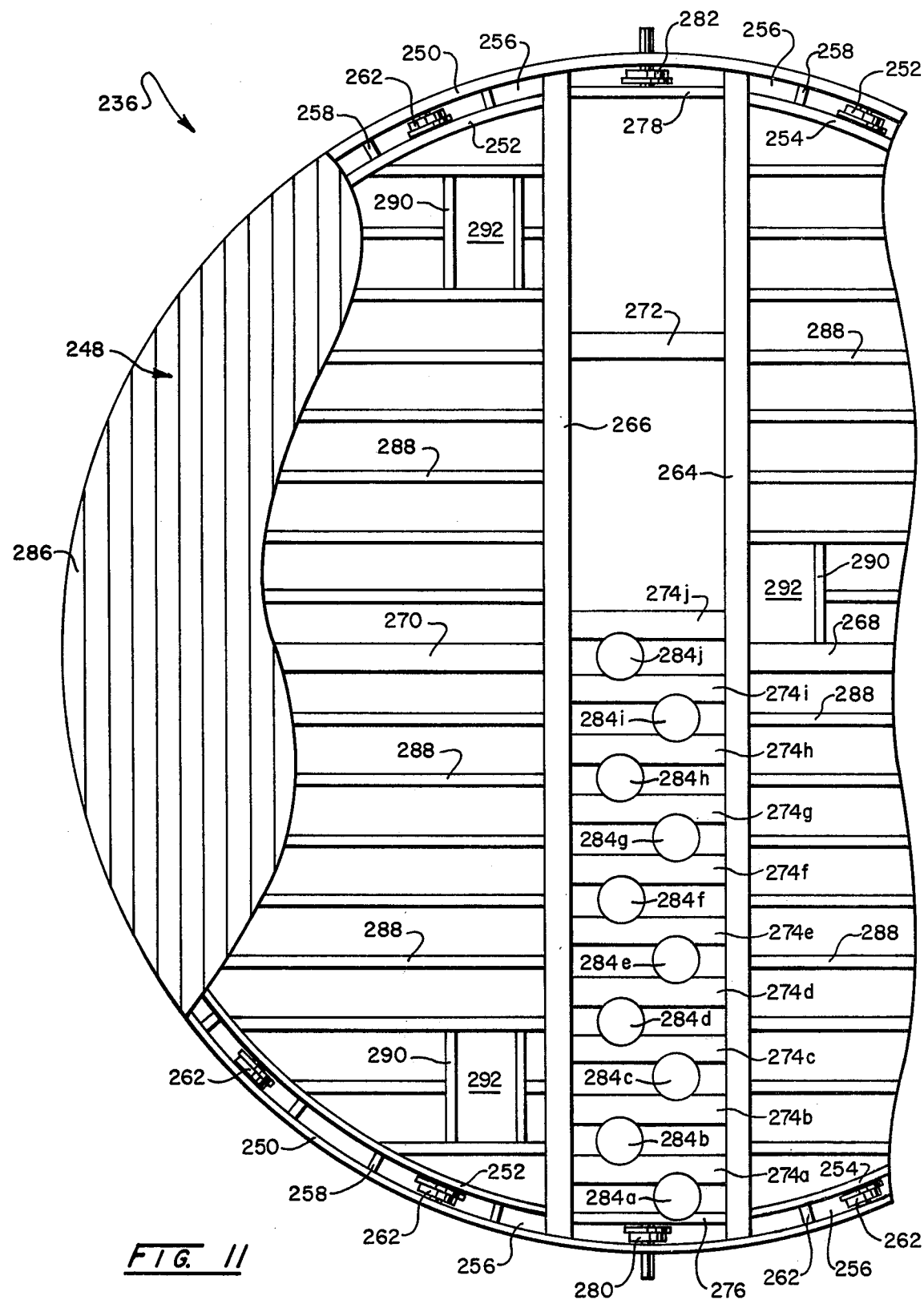
FIG. 11 is a top partial view of the apparatus of FIGS. 6–10 with portions removed to reveal internal structure.

The receptacle is enclosed by a rigid cover of circular configuration. As is revealed in more detail in FIGS. 8 and 11, the outer circular periphery of cover 248 is fashioned having an outer circular form channel which is coaxial with and mutually radially spaced from oppositely disposed semicircular channels 252 and 254 to define a gap 256 therebetween (FIG. 11). Spacers 258 provide support across the gap 256. This gap 256 is located above the periphery of wall 244 which, additionally, is formed incorporating a metal rail 260. Axially supported within gap 256 intermediate channels 250, 254 and 256 are a plurality of freely rotatable flanged wheels or bearings, certain of which are shown at 262 in FIG. 11. Extending across chords of the circle defined by channel 250 rigidly connected thereto are two spaced wide flange beams 264 and 266. Additionally, similar beams 268 and 270 extend in radial fashion between channel 250 and respective beams 264 and 266. Beams 264 and 266 are interconnected by transversely oriented shorter length wide flange beams, located along one half or side of the assembly, while opposite thereto a transverse beam 272 is connected intermediate beams 264 and 266. On the noted one side of the assembly a plurality of such interconnecting beams are arranged in spaced fashion and are identified 274a–274k. Channel members 276 and 278 are positioned across the termini of beams 264 and 266 and serve to support the axles fixed to and extending through drive wheels for the roof structure revealed respectively at 280 and 282. As is described in more detail later herein, these symmetrically oppositely disposed drive members serve to rotate the rigid cover during operation of the apparatus. Their positioning assures unhindered rotational operation without the generation of spurious moments and the like. Not shown in FIG. 11 are relatively thin steel plates, for instance of about one fourth inch thickness, which are weldably attached over the top and bottom of beams 264 and 266 as they extend from channel 276 to beam 224k. These plates serve to support the spools from which the auger elements of the device depend. The lower flanges of the uppermost ones of the spools are revealed in FIG. 11 at 284a–284j. This same serial, alphabetical suffix arrangement is utilized throughout the instant description to designate corresponding components of the serially disposed auger elements. Cover 248 serves, inter alia, to protect the contents of the digester apparatus 236 from atmospheric elements. In this regard, it may be provided, for instance, with a tongue and groove type wooden top or roof portion as at 286. To support such a top, a plurality of beams are provided extending from inwardly disposed circular channel 252 to beam 264 as well as from inwardly disposed channel 252 to beam 266. These wooden beams are identified, for example, at 288. Where appropriate, the beams are utilized in conjunction with transverse members as at 290 to provide for access openings as indicated at 292. The wooden components utilized within the cover structure provide adequate support at lessened structural weight and, preferably, are pretreated with an appropriate preservative. Of course, other structural materials may be utilized to form the above-discussed structure.

As is revealed in FIGS. 2, 5 and 8, cover 248 serves, inter alia, as a support for a screw type conveyor 294 extending from hopper 242 to the vicinity of the cylindrical wall 244 of the digester apparatus. The distribution port of conveyor 294 is defined by a distribution conduit 296 extending from the terminus of conveyor 294 through rigid cover 248 just inside the cylindrical wall. Conveyor 294 is driven through a reduction gearing assembly 296 by belt or chain drive association with a motor 298. With the arrangement, biodegradable material is internally deposited about the outward periphery of wall 244 in a fashion providing for the uniform distribution thereof about the internally disposed circumference of the apparatus.

Figure 5B:
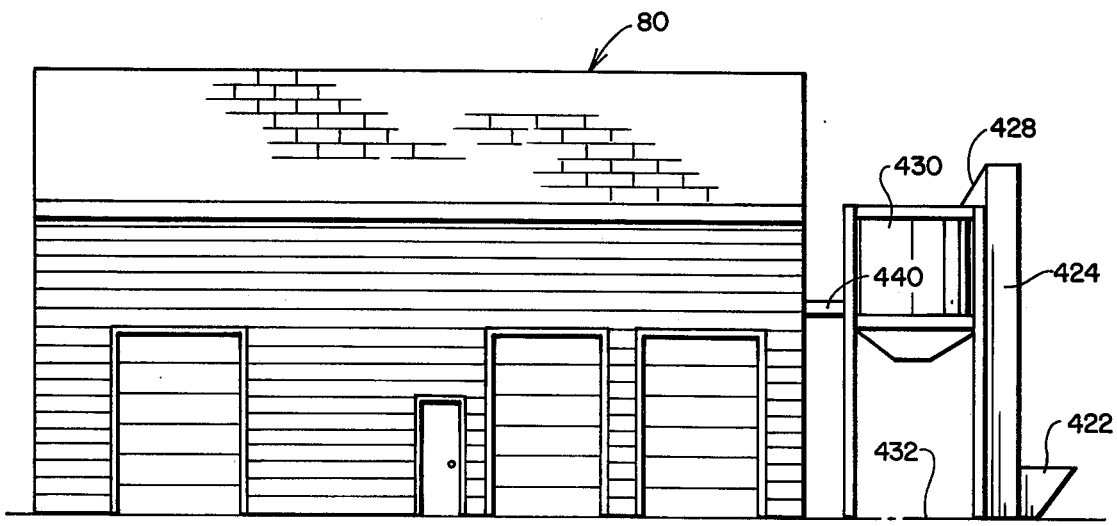
Figure 6:
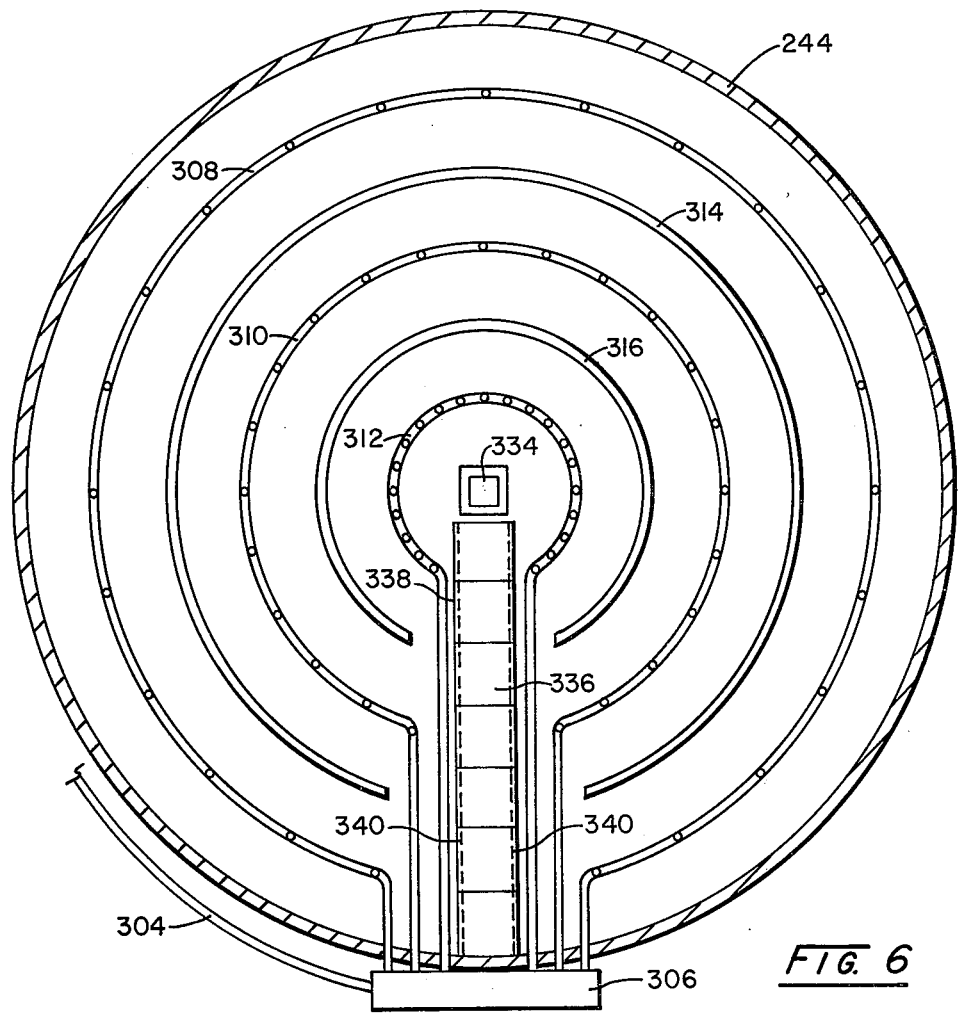
FIG. 6 is a top sectional view of portions of the digester apparatus shown in FIGS. 2 and 5.
Figure 7:
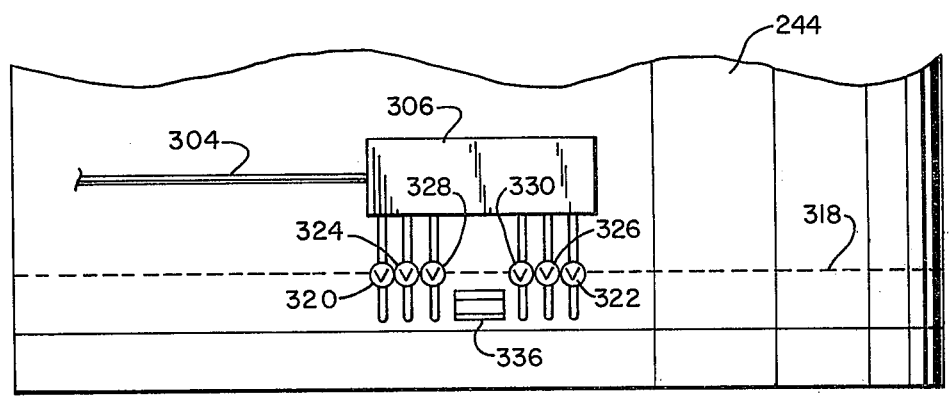
FIG. 7 is a partial side view of the digester apparatus of FIG. 6.
Figure 10:
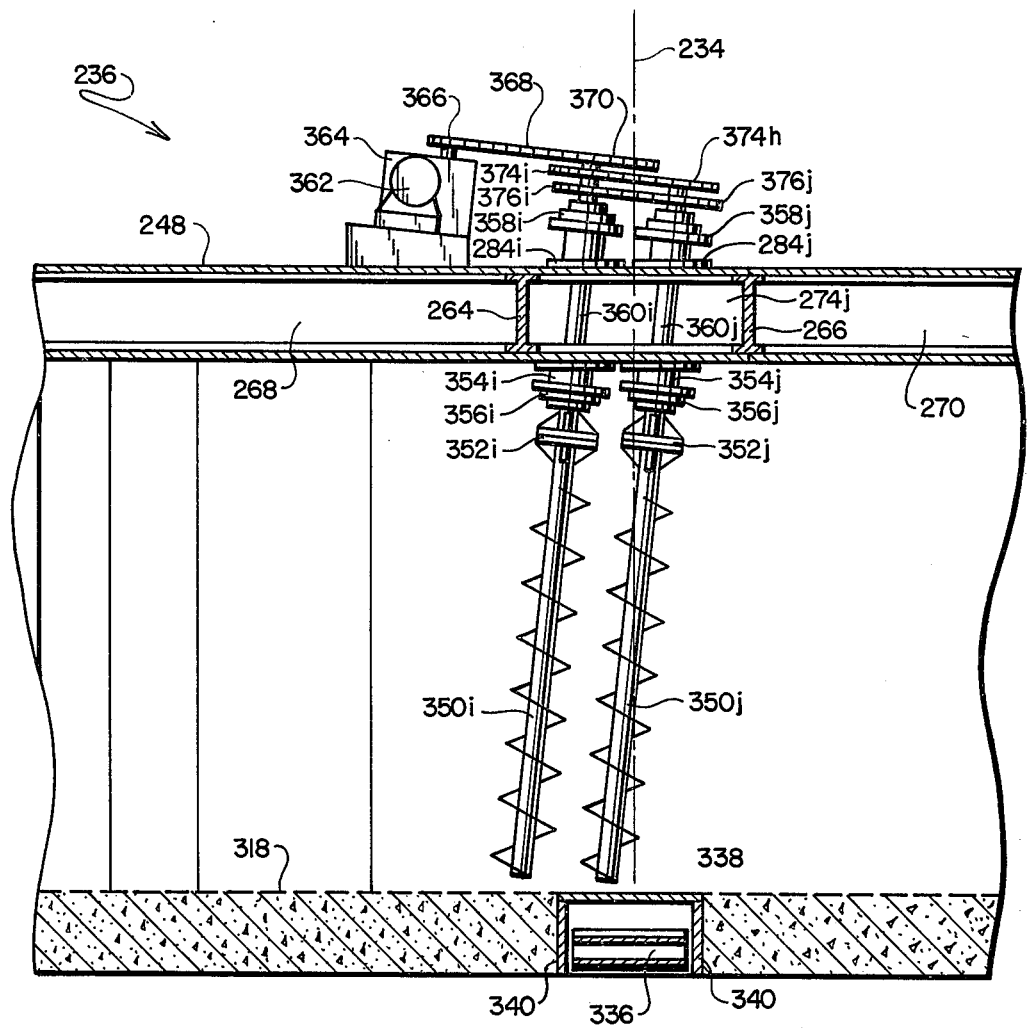
FIG. 10 is a partial sectional view of the apparatus of FIGS. 8 and 9.

Looking now to the bottom surface of apparatus 236, reference is made to FIGS. 5, 6, 7, 8 and 10. As noted earlier, the digestive process is carried out by subjecting a pH, nitrogen and moisture content adjusted biodegradable material to oxygen laden gas treatment as well as agitation. The oxygen laden gas, here present as atmospheric air, is introduced into digester apparatus 236 from a motor driven blower 300 located, for this example, within a control room 302 of the building represented in FIG. 2. Air under pressure is directed from blower 300 along line 304 to a plenum 306 fixed to wall 244 of apparatus 236 (FIGS. 6 and 7). Plenum 306 serves as an air feed to a grouping of conduits located at the bottom portion of apparatus 236. These conduits are identified in FIG. 6 at 308, 310 and 312 and are arranged concentrically about the central axis of apparatus 236. The conduits are arranged to deliver air under pressure through small perforations formed therein within regions of the digestible material intended for influence. To delineate or label this influence, a concentrically disposed baffle 314 is positioned intermediate conduits 308 and 310, while a similar baffle 316 is positioned between conduits 310 and 312. The baffles have heights extending to the upper surface of diffuser material such as coarse aggregate deposited over the bottom surface of the assembly. The level of this diffuser material or aggregate is shown in FIGS. 8 and 10 at 318. As shown in FIGS. 6 and 7, connection between conduit 308 and plenum air supply 306 is provided through valves 320 and 322, while connection of conduit 310 with the air supply is through valves 324 and 326 and connection between conduit 312 and the air supply is through valves 328 and 330. These valves may be of a motor operated butterfly variety functioning in step fashion in response to commands received from a remotely disposed control station. Such control, for example, may be derived from a control facility as at 332 located within room 302 of the building shown in FIG. 2. The separate regions of influence defined through the utilization of discrete conduits as at 308-312 in combination with baffles 314 and 316 provide for a corresponding regionally oriented control over the digestive process. For example, discrete monitoring of temperature and oxygen content may be effected within the regions defined by baffles 314 and 316 and appropriate regulation asserted through valves 320-330 in correspondence with that monitoring. As noted at block 188 in FIG. 1A, the biochemical oxygen demand (B.O.D.) of the material under treatment diminishes progressively as such material is migrated from one of the conduit and baffle-defined regions to the next.

As is revealed more clearly in FIGS. 6 and 8, also positioned within the lower portion of digester apparatus 236 is an output arrangement including an opening 334 substantially centrally disposed within the apparatus and defining a rectangular opening or orifice at the upward surface 318 of the diffuser material or aggregate. This orifice-conduit, which may be either rectangular or circular in peripheral configuration, communicates with a flight feeder or conveyor 336 radially positioned within the diffuser material and extending through wall 244. Removable plates 338, supported by two channel members 340, cover conveyor 336. The flight feeder or conveyor 336 which may be utilized in the instant application may be of a conventional variety in which endless chains disposed in parallel are driven within guiding channels disposed on either side of a supporting surface. The chains, conventionally designated as "drag chains" are connected to a series of parallel flights or metal angles which are moved along the surface of the feeder to convey material. Typical of such feeders are the car unloader types marketed by the Fairfield Engineering Company, Marion, Ohio. As is revealed in FIGS. 2, 5, and 8, feeder 336 is configured such that its outer end portion 342 extends upwardly upon passing through receptacle wall 244. Drive for the conveyor is provided by a variable speed motor 344 operating in belt drive relationship with a reduction gearing (not shown). From conveyor portion 342, the material is deposited within a bin 346 (FIG. 2) for transfer to the curing region as described in connection with block 212 of FIG. 1A.

As shown in FIGS. 8, 9, 10 and 11, agitation of the biodegradable material deposited within the digester apparatus 236 is provided by a series of rotatably driven augers alternately disposed along chords defined to be parallel to a given radius of the rigid roof structure 248. The discrete augers of the agitator arrangement are identified at 350a-350j and are shown extending from a tip portion situate just above level 318 of the aggregate diffuser material to upwardly disposed bolted flange couplings respectively revealed at 352a-352j. Couplings 352a-352j, in turn, are coupled with drive shafts extending through cover 248 at and rotatably supported by respective lower canted spool pieces 354a-354j. Thrust bearings as at 356a-356j are positioned intermediate respective flanges 352a-352j and spool pieces 354a-354j. The upward flanges of spool pieces 354a-354j are bolted to the earlier noted steel plate fixed in turn to the lower flanges of beams 264 and 266 described in connection with FIG. 11. Drive shafts extending respectively through spool pieces 354a-354j continue to extend through corresponding spool pieces 284a-284j and respective thrust bearings 358a-358j. These shafts are identified in FIG. 9 at 360a-360j. Drive to shafts 360a-360j is provided from a motor 362 operating in conjunction with a reduction gear assembly 364. The output of reduction gear assembly 364 is connected through a sprocket 366 which asserts drive through chain 368 to a main drive sprocket 370. Sprocket 370, in turn, is fixed to shaft 360c which, in turn, imparts rotational drive to sprocket 374b of upper sprocket grouping 374a-374h. Shaft 360c also imparts rotational drive to sprocket 376c of a lower grouping of sprockets similarly connected to respective shafts 360a-360j. Adjacent ones of the upper grouping of sprockets 374a-374j are appropriately connected as shown, by chain drives, as are adjacent groupings of the lower level sprockets 376a-376j. By adjusting the number of teeth in alternate ones of the sprockets, a drive is imparted to drive shafts 360a-360j wherein, for example, a 2 R.P.M. diminishment in rotational speed is progressively provided from auger to auger commencing with that auger driven from shaft 360b. For example, sprocket 374b may be provided with 35 teeth, while corresponding driven sprocket 374a is provided having 32 teeth. Sprocket 376b, coupled with the same shaft, may then be provided with 35 teeth, while sprocket 376a is provided with 32 teeth. In the same fashion, sprocket 376c may be provided having 32 teeth, while driven sprocket 376d may be provided having 35 teeth. This arrangement continues through to the centermost drive shaft 360j. As is revealed in FIG. 10, spool pieces 284a-284j and corresponding spool pieces 354a-354j are canted in the direction of intended rotation of cover 248 to facilitate the movement of the agitating system through the bulk mass of digestible material. As noted earlier in connection with FIG. 11 and shown in FIGS. 2, 8 and 9, this drive basically is provided from drive wheels 280 and 282 which are connected to corresponding drive sprockets, respectively shown at 380 and 382. Sprockets 380 and 382, in turn, are linked by chain drive to respective output sprockets 384 and 386 of associated reduction gearing assemblies 388 and 390. Assemblies 388 and 390 are driven from respective synchronous motor drives shown at 392 and 394. A belt connection is shown providing drive relationship between the latter components of the system.

For the application described as exemplary herein, the drive system for cover 248 provides for a rotation thereof of from about 1 to 2 revolutions per hour. During these revolutions the agitation system including augers 350a-350j, confronts substantially all of the digestible material and imparts a vertical motion thereto. Additionally, a horizontal migration of the particles from the peripheral regions of the apparatus toward the center axis 234 thereof takes place. To assure proper digestion of all materials within the system, it is important that the migration along a horizontal vector be controlled. For instance, an unwanted condition would ensue where particles reach the surface of the digesting materials and "skip" across such top surface toward the center of the system. With the instant arrangement, however, such particles cannot be removed from the digester apparatus and any particles which are removed must be in a reliably fully digested state. In this regard, notice that the orifice or opening 334 of the system is of substantially small peripheral extent with respect to the size of the periphery of walls 244. Further, this opening is substantially at the surface 318 of the diffusing aggregate material, i.e. at the very bottom of the digester. Consequently, only the lowermost level in centrally migrated materials can be removed through conveyor 336.

To promote the deposition of material into conveyor 336 which are situate in the vicinity of orifice 334, auger 350j is located substantially over orifice 334. As cover 248 is rotated, this auger is maneuvered, in turn, to define a somewhat conical pattern of movement about the orifice. This action promotes the corresponding deposition of fully digested material through orifice 334. The ratio of the circumference of orifice 334 with respect to that of wall 244 may be selected, for instance as about 1 to 20, however, the relative extent of the periphery of orifice 334 readily may be diminished with respect to the circumference of the outer wall depending upon the particular desire of the designer. The assurance of a uniformly and properly treated material with the digestion apparatus improves the value thereof thus enhancing the economic rational for incorporating digestion systems within the facilities of the paper production industry.

A particularly advantageous feature of the noted positioning of auger 350j over the discharge orifice 334 resides in the capability of promoting removal of fully digested materials without clogging of the system. For example, in prior art devices, clogging represents a serious operational problem usually necessitating the continuous operation of the device removing digested material from the apparatus. In the instant system, however, feeder 36 need be operated only when required i.e. on an intermittent basis. This assures removal of only properly digested material. Additionally, the device may be operated automatically, for instance, through the utilization of probes as at 376 which are described later herein. Migration of materials further is facilitated by virtue of the fact that the digester incorporates no center support, migration materials being carried with complete freedom of movement.

Looking more specifically to the control over the digestion process, as the nitrogen and moisture content adjusted biodegradable material is deposited through conduit 296 into the receptacle of the digestion apparatus 236, it is distributed within a region disposed about the outer circumference thereof, uniformity of deposition being provided by the virtue of the rotation of cover 248. The augers of the agitating components of the system assert a vertically oriented movement to the particles of the material and a slight, horizontal vector-defined migration of the bulk toward the center orifice 334 over an extended period of time, for instance four to five days, is witnessed. The thus deposited and migrating material is subject to the influence of oxygen laden gas passing therethrough emanating from the diffusion aggregate and conduits 308, 310 and 312. Selective control over the amount of air administered to the bulk within the regions defined by these conduits as well as by baffles 314 and 316 is desirable, inasmuch as the biochemical oxygen demand of the material diminishes as it undergoes aerobic thermophilic reaction or activity. Since such activity is both temperature dependent and responsive as well as oxygen dependent, monitors preferably are provided within such defined regions and, particularly, in the vicinity of the exit orifice 334. To provide such monitoring, temperature and gas sampling probes are located within each of the regions. As revealed in FIG. 8, probes as at 400, 402 and 404 are arranged to protrude upwardly from the bottom portion of the digester, probe 400 being within the outermost peripheral region, probe 404 being within the region adjacent exit orifice 334 and probe 402 being in the region intermediate those designated above. Generally, such probes will sample both gas within the region as well as temperature about every minute and one-half. Additionally, a bulk level probe 406 is provided for purposes of monitoring the level of material within the digester. Oxygen analysis is carried out from the sampled gases drawn through probes 400–404, for the instant application, a low value of oxygen generally being about 8% by weight, while an upper value for oxygen generally being about 16%. Of course, the levels determined for each region vary with desired B.O.D. conditions for the material being digested. Adjustment for oxygen level is readily accommodated by control over the valves 320–330 associated with each of the conduits 308–312. With respect to temperature levels, thermophilic digestion generally is available between temperatures of about 130° F. to 175° F. It is generally preferred to control the digestive process within this range at approximately 155° F. Preferably such level is maintained with about a ±2° F. tolerance. On the occasion of a temperature level reaching above the designated high level, higher quanitites of air or oxygen laden gas are pumped into the digester to carry out a cooling function thus overriding the digestive process to a considerable extent. Additionally, high temperature can be lowered by progressively diminishing the input of oxygen laden gas or air through manipulation of the control valve at the input to the apparatus. Where temperatures fall below the lower level, slightly more oxygen is introduced in appropriate regions to accelerate the aerobic thermophilic process.

Another feature of digester 236 resides in its capability for enhancing the pressure and consequently the oxygen content of the gas or air introduced into the receptacle portion thereof. In this regard, a flexible seal 410 (FIG. 8) may be attached to the outer periphery of cover 248. This seal slideably engages the upward portion of wall 244 and both assures the exclusion of atmospherically carried contaminants as well as provides a form of pressure retention within the receptacle. Note in this regard, that in normal operation, conduit 296 of feed conveyor 294 as well as the opening defined thereby into the digester receptacle is filled with material awaiting deposition for digestion. As a consequence, the general pressure level of the introduced pressurized air may be slightly elevated over atmospheric. This feature is helpful in improving digestion efficiency of the device at higher altitude locations. Loss of pressure through the conduit 296 can be minimized with complete reliability through the simple expedient of incorporating a "star" feeder therewithin. With such arrangement, no significant loss of pressure will be witnessed within the system.

As indicated earlier herein in connection with function blocks 212 and 214 of FIG. 1A, a desirable feature of the system resides in providing for a curing step in the final processing of the thermophilic phase digested bark material. Accordingly, through the utilization of front-end loader or the like, digested compost material is removed from bin 346 (FIG. 2) and retained in curing storage at a region of the facility designated by the regional outline 420. By simply allowing the deposited material to reside in pile form over a period ranging from about fifteen to thirty days the noted curing process in the mesophilic range is carried out. No overhead covering or the like is required for the curing material, conventionally encountered environmental atmospheric conditions being appropriate. During this period, the forty to forty-five percent by weight moisture content of the material will be observed to be reduced to about twenty percent by weight. Additionally, a further breakdown of the cellulosic content of the material will be witnessed to advantageously lower the carbon-to-nitrogen ratio still further. Such an arrangement particularly is desirable where the compost material is to be utilized in the horticultural or agricultural fields. As noted earlier, additional advantage ensues for the latter utilization. That is, the material will break down to a finer particulate structure during the curing period.

Following curing, the front end loader utilized at the facility may again be operated to move the cured material to a yard hopper as at 422 which is arranged to feed a bucket elevator 424 or other inclined conveying means. Elevator 424 transfers the material from hopper 422 into an elevated storage bin 426. To provide appropriate entry into bin 426, a chute director 428 is provided. Bin 426 is supported in its elevated orientation by a box-like structure 430 in a manner and at an elevation such that trucks may maneuver along roadway 432 for loading therebeneath (FIG 5B). Alternately, the material may be passed along chute 440 into region 222 of building 80. At this location, the material may be directed into a conventional bagging device 442 at which position bags are filled with the material whereupon they are conveyed along the conveyor 444 to be sealed at a sealer station 446 and collected upon a carrousel accumulator 448. From accumulator 448 the bagged product is stored pending its ultimate sale and delivery to industrial users as well as wholesale and retail outlets.

Should it be desired to lower the water content of the material exiting from digester 236 below the forty to forty-five percent by weight value normally encountered, the quantity of air issuing through conduit 312 (FIG. 6) may be increased above that normally required to meet the thermophilic digestion requirements. As a consequence, the moisture content can be lowered toward the twenty percent value otherwise derived by curing the material at region 420. With such an arrangement, the curing stage normally would not be utilized and the interval for treatment of the bark is correspondingly lowered.

Turning now to FIG. 12, another embodiment for a digester arrangement which may be utilized with the system of the invention is revealed generally at 450. Digester 450 does not incorporate the particular loading feature of the earlier embodiment and has the general configuration of an elongate rectangular bin having verticle side walls 452 and 454 arranged in spaced parallel relationship and extending between end walls 456 and 458. As is revealed more clearly in FIG. 14, side walls 452 and 454 may be fashioned of reinforced concrete or concrete blocks and each is supported upon foundations or footings represented respectively at 460 and 462. The floor surface between footing 460 and 462 and/or walls 452 and 454 may be formed for example as a layer of asphalt 463. The upper surface of this floor is represented at 464. As in the earlier embodiment, disposed over floor surface 464 are gas conduits present as pipes 466 and 468. Looking to FIG. 12, pipes 466 and 468 extend the length of digester 450 and are formed having a plurality of spaced air outlets along their lengths for introducing oxygen laden air into the digester to effect an aerobic influence over all of the treated bark deposited therewithin. Additionally, as in the earlier embodiment, a diffuser arrangement is provided as a layer of coarse aggregate 474 deposited upon floor surface 464 and covering conduits 466 and 468. The upper surface 476 of diffuser material 474 serves, to support the digestible bark material during the digestion process.

Conduit or pipes 466 and 468, are coupled with a plenum 470 positioned on the outer side of end wall 456. Receiving air under pressure from a blower and input line, respectively, as at 300 and 304 in FIG. 2, plenum 470 serves as an air feed for the system. Similar to the arrangement in FIGS. 6 and 7, each of the conduits 466 and 468 is connected to plenum 470 through a motor operated valve, for example of the butterfly variety, which functions in step fashion in response to commands received from a remote control station. As before, such control may be derived from a control facility, as at 332, located within room 302 of the building shown in FIG. 2.

Figure 14:
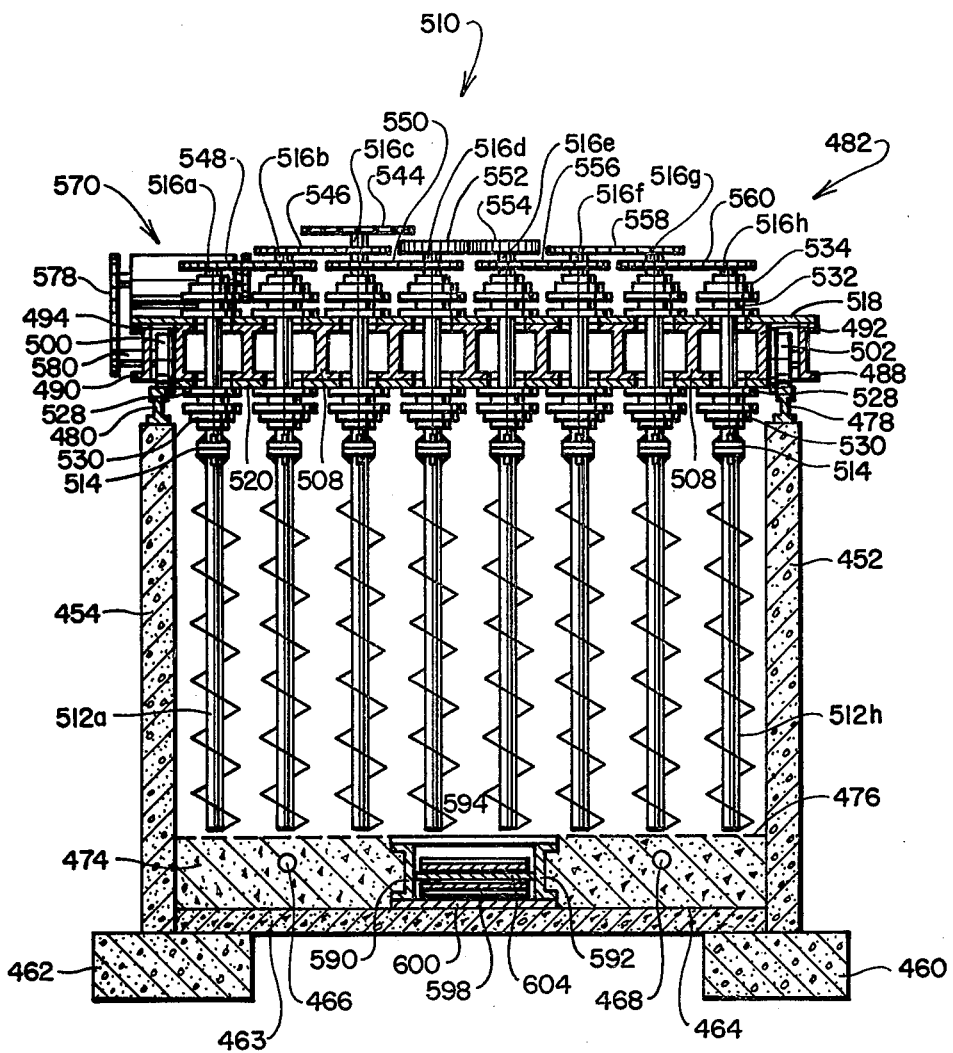
FIG. 14 is a sectional view taken through the plane 14—14 of FIG. 12.

The upward or top surfaces of walls 452 and 454 respectively support rails 478 and 480 which extend in parallel relationship along the entire lengths of the side walls. These rails support a carriage represented generally at 482. Looking additionally to the FIGS. 13, 15 and 16, carriage 482 is formed having a rectangular platform structure including peripherally disposed channel members providing a box-like construction. The forward and rearward ones of the channel members are revealed respectively at 484 and 486 in FIG. 16, while the outwardly disposed side channel members are shown in FIG. 14 at 488 and 490. The latter channel members cooperate respectively with internally disposed channels 492 and 494 to provide wells within which four wheels as at 500 and 502 in FIG. 14 and 498 and 500 in FIG. 16. As shown in FIG. 16, two principle supports are provided across the carriage and are present as wide flange beams 504 and 506. These beams which, in turn, support transversely oriented beams as at 508 (FIG. 14) as well as channels 492 and 494, serve as the basic retaining structure for a series of auger-type agitators represented generally at 510. Structured similarly to those augers described in connection with FIG. 8 above, the discrete augers of the agitator arrangement 510 are identified at 512a–512h and extend perpendicularly from a tip portion situated just above level 476 of the aggregate diffuser material to upwardly disposed bolted flange couplings, one of which is revealed at 514. Couplings 514, in turn, are connected with drive shafts as are serially identified at 516a–516h, which extend through carriage 482. Note, that steel plates 418 and 520 are attached to beams 504 and 506 (FIG. 16) at the respective upper and lower surface of the carriage as part of the supporting structure for the auger arrangement 510. Each of the drive shafts as at 516a–516h are rotatably supported by lower spool pieces, certain of which are identified at 528. Additionally at the lower surface, thrust bearings as at 530 are positioned intermediate flanges 514 and spool pieces 528. The upwardly disposed flanges of spool pieces 528 are bolted to the lower steel plate 520 of the carriage range.

Drive shafts 516a–516h extend perpendicularly through upper steel plate 518 and through corresponding spool pieces 532 and thrust bearings 544 on the upward surface of the carriage (see FIG. 16).

Figure 15:
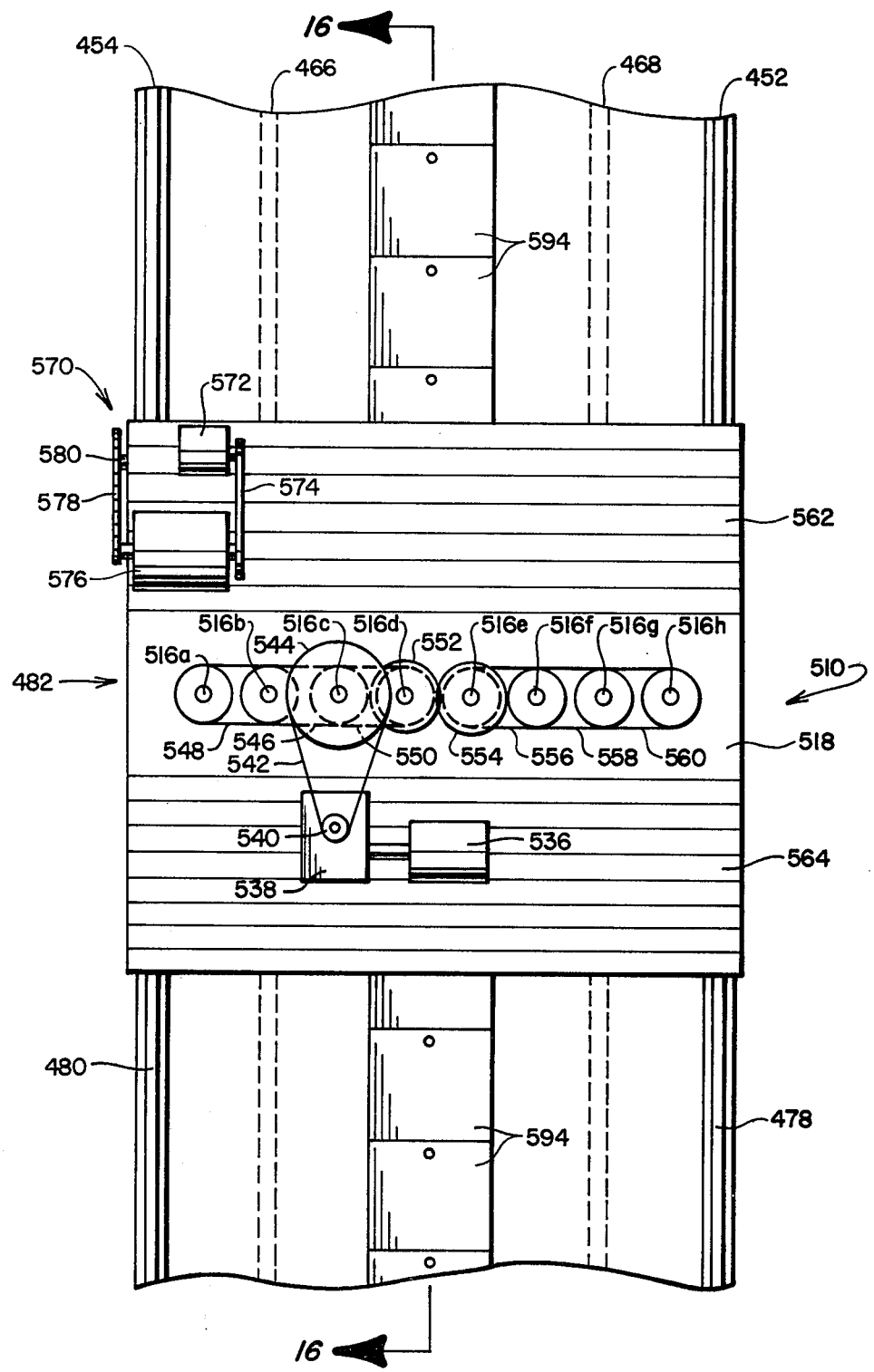
FIG. 15 is an enlarged partial view of a portion of the apparatus of FIG. 12.

As revealed in FIGS. 15 and 16, drive to shafts 516a–516h is provided from a motor 536 operating in conjunction with a reduction gear assembly 538. The output of reduction gear assembly 538 is connected through a sprocket 540 (FIG. 15) which inserts drive through a chain 542 to a main drive sprocket 544. Drive sprocket 544 is connected to drive shaft 516c which, in turn, is coupled in driving relationship with a lower disposed sprocket and chain assemblage 546, which extends to a corresponding sprocket at shaft 516b. Shaft 516b, in turn, is coupled to a sprocket and chain assemblage 548 to impart drive to shaft 516a. Another sprocket and chain assemblage 550 provides drive from shaft 516c to shaft 516d. With the arrangement thus described, one half of the auger members, i.e. 512a–512d, are interconnected to be ultimately driven from main drive sprocket 544. However, there is no differential in rate of rotation for each one, all sprocket and chain assemblies being identically dimensioned and configured. Additionally, these augers all rotate in one selected rotational sense.

As further revealed in FIGS. 14 and 15, drive shafts 516d and 516e are connected to respective spur gears 552 and 554. These gears are identically configured and mesh at a point of tangency somewhat directly over the center line of the digester assembly 510. As is apparent, gears 552 and 554 serve to transfer rotative drive to the remaining four augers 512e–512h, while simultaneously effecting a reversal of the sense of rotation of those augers with respect to augers 512a–512d. Uniform rotative drive is provided between shafts 516e and 516f by a sprocket and chain assembly 556; between shafts 516f and 516g by sprocket and chain assembly 558; and between shafts 516g and 516h by sprocket and chain assembly 560.

With the above arrangements wherein the opposed halves of assembly 510 contain augers which rotate in mutually opposite sense, substantially no turning moment is induced into the carriage 482 during its operation.

Looking to FIGS. 15 and 16, the upward surface of carriage 42 is shown having a surface formed either of wood planking or checker-type steel plate at regions thereof extending outwardly from steel plate 518. Such regions, for example, are revealed at 562 and 564. Upon the surface at region 562 there is mounted a carriage drive assembly indicated generally at 570. Assembly 570 includes an electric motor 572 which provides a drive input through belt 574 to a gear reduction assembly 576. The output of assembly 576, in turn, is coupled through chain drive 578 to the drive axle 580 of drive wheel 500 (FIGS. 14 and 16).

When motors 576 and 536 are energized, carriage 482 is driven at a relatively slow speed back and forth over rails 480 and 478 of the digester 450. As this movement takes place, augers 512a–512h are rotated to provide necessary agitation of the bark material being digested while, simultaneously, the bark is maintained under the influence of induced atmospheric air issuing through diffuser 474 from conduits 466 and 468. Digester facility 450 is intended for bulk loading of the biodegradable material which it processes. In this regard, frontend loaders are utilized to deposit the material over one or both of the side walls at 452 or 454. The thus deposited material is generally leveled by the action of agitator assembly 510 as it moves along rails 478 and 480. Following an optimum period for the thermophilic phase digestion to take place, for instance, from one to two weeks, carriage 482 is de-energized and the fully digested material within the digester is removed.

Looking now to the technique for removing the digested bark, now present as a humus material, and turning to FIGS. 12, 14 and 16, an elongate channel, the side peripheries of which are defined by channel members 590 and 592, is centrally positioned along the entire length of digester 450 (see FIG. 14). Over the upper surface of channel members 590 and 592 are positioned a plurality of rectangular steel plates 594. These plates are not fixed to channels 590 and 592 and are both manually removable and slideable over the channel members. Substantially the entire centrally disposed channel is covered by plates 594, with the exception of an opening 596, representing the area otherwise taken by two of the plates 594 and provided, for each new loading of the digester, adjacent end wall 458 (FIG. 12). Plates 594 cover an elongate flight feeder which, as is revealed in FIGS. 14 and 16, is positioned between plates 594 and a bottom metal plate 598. Configured in conventional form, this flight feeder is fashioned of a series of metal angle-type flights 600 which are conveyed along the length of the centrally disposed channel by peripheral chains, one of which is revealed in FIG. 16 at 602. Intermediate the upper and lower disposed components of the chains and coupled flights is a central metal supporting surface or sheet 604. As shown in FIGS. 12 and 13, the flight-type conveyor extends outwardly from end wall 456 of the digester and is angled or elevated upwardly along portion 604 thereof so as to expel humus materials into a bin 606. Motor drive for the conveyor is represented at 608.

During an unloading operation, carriage 482 is deenergized and motor 608 is energized to commence the movement of flights 600 in a manner wherein the upwardly disposed ones thereof are moved toward end wall 456. This action initially draws the humus material within the digester through opening 596 and thence along the upper portion of the flight conveyor for deposition within bin 606. The bulk of humus material in the vicinity of end wall 458 gradually is removed to an extent where a laborer may remove the door 607 in end wall 458 and with a hooked steel rod reach through the opening and pull the plate to position 596 thus making a new opening for removal of compost. The laborer then moves the next plate forward until at least two plates are moved to form a clear working place. The laborer then enters the digest and standing on the clear plates continues to move the plates toward the rear until the digester is clear of all the material except the natural repose of the compost between the conveyor sides and its side walls. As the material is substantially removed from the vicinity of opening 596, the laborer slides that plate 594 next adjacent opening 596 toward end wall 458 for a distance of one plate width. The flight conveyor then removes that material otherwise supported by the shifted plate and the procedure continues until that plate adjacent the opposite end wall 456 is slid rearwardly to define the final opening. At this juncture digester 450 is emptied and the initially shifted one of plates 594 is positioned at the final plate opening adjacent end wall 456. Digester 450 then is ready to receive a next batch loading of biodegradable bark material treated as described earlier herein. Generally, about an 18 inch layer or equivalent thereof of the digested material of a preceding batch is left in the digester to act as a catalyst for inducing the aerobic thermophilic phase digestion of the next succeeding batch.

Since certain changes may be made in the above-described system and process without departing from the scope of the invention herein involved, it is intended that all matter contained in the description thereof or shown in the accompanying drawings shall be interpreted as illustrative and not in a limiting sense.

We claim:

1. In a system for manufacturing paper products and the like wherein pulp tree bark is removed as a preparatory procedure to pulping and wherein a sludge categorized effluent is generated as a waste product, the improvement comprising:

recieving means for receiving said removed bark in an aerobically untreated state;

first means for providing nitrogenous material;

second means for providing an aqueous liquid;

mixing means for receiving, agitating and retaining, for a predetermined interval, said bark, said nitrogenous material and said aqueous liquid to provide a moisture and nitrogen content adjusted substantially biodegradable material;

transfer means for conveying said moisture and nitrogen content adjusted material;

digester means for inducing the aerobic, thermophilic phase decomposition of said biodegradable material including:

a receptacle of generally cylindrical surface configuration having a circular top edge portion, a bottom portion supportable upon a base and dimensioned for retaining a predetermined volume of said material;

means for supplying atmospheric air under pressure;

conduit means connected with said means for supplying air, positioned within said receptacle substantially at the level of said bottom portion, including a plurality of spaced outlets for said pressurized air, arranged in a pattern for effecting an aerobic influence over substantially all of said material deposited within said receptacle by air issuing from said outlets;

diffuser means positioned within said receptacle, having an upward surface for supporting said material above said conduit means and for effecting a diffusion of said air issuing from said outlets;

support means extending diametrically across said receptable and supported upon said receptacle circular top portion and rotatable thereupon about the centrally disposed axis of said cylindrical surface;

input means supported upon and rotatable with said support means for receiving said material from said transfer means and depositing said received material into said receptacle in the vicinity of said cylindrical surface;

agitator means including rotational, auger-type agitators supported by said support means and rotationally moveable about said receptacle, each said agitator extending substantially to the upwardly disposed surface of said diffuser means, said agitators being serially disposed and mutually spaced within two substantially parallel rows each extending from the vicinity of said axis of said cylindrical surface toward said cylindrical surface and of number sufficient to confront substantially the entirety of said material when moved a full revolution about said receptacle, said agitator means and said diffused air effecting a progressive diminution of the biochemical oxygen demand of said material; and output means including means defining an orifice positioned at said axis of said cylindrical surface at said upward surface of said diffuser means for removing from said receptacle said material evidencing a substantially low biochemical oxygen demand value within said receptacle and being designated thermophilic phase digested material; and at least one said auger-type agitator being positioned above at least a portion of said orifice so as to effect an agitation of digested bark located thereabove.

2. The improved system of claim 1 wherein said mixing means is configured to retain and agitate said bark nitrogenous material and aqueous liquid to provide a said moisture and nitrogen content adjusted material having a substantially uniform moisture content within a range of about fifty to sixty percent by weight.

3. The improved system of claim 1 including: third means for providing an alkaline material to said mixing means at a rate effective to constitute said moisture and nitrogen content adjusted material as exhibiting a pH substantially approaching a value in the range of about 6 to 7.

4. The improved system of claim 3 wherein said mixing means is present as a pug mill.

5. The improved system of claim 1 wherein said mixing means is configured to retain and agitate said bark, nitrogen containing material and aqueous liquid to provide a said moisture and nitrogen content adjusted material having a substantially uniform moisture content and a carbon to nitrogen ratio by weight of about 30 to 1.

6. The improved system of claim 5 in which said mixing means is configured to retain and agitate said bark, nitrogenous material and aqueous liquid to provide a said moisture and nitrogen content adjusted material having a substantially uniform moisture content within a range of about fifty to sixty percent by weight.

7. The improved system of claim 1 including means for transferring said thermophilic phase digested material to a curing region and maintaining said material thereat within ambient environmental atmospheric conditions for an interval adequate to achieve a mesophilic phase decomposition thereof.

8. The improved system of claim 7 in which said thermophilic phase digested material is retained at rest at said curing region for an interval sufficient to lower the moisture content thereof to about twenty-five percent by weight.

9. The improved system of claim 1 wherein said second means provides said aqueous liquid as said sludge categorized effluents.

10. The improved system of claim 1 wherein said conduit means are configured as a pattern of rings disposed within the said bottom portion of said receptacle and positioned in serially, concentric fashion from said orifice to said cylindrical surface; and including means for selectively increasing the flow of said air through the said openings of said ring conduit most adjacent said orifice so as to effect a lowering of the moisture content of the said thermophilic phase digestive material.

11. A method for treating the pulp tree bark generated as a by-product of a pulping facility comprising the steps of:

recieving said bark at a receiving station;
providing a supply of aqueous liquid;
providing a supply of nitrogenous material characterized in releasing substantial amounts of said nitrogen under conditions of aerobic digestion;
mixing said bark with predetermined quantities of said nitrogenous material and aqueous liquid for an interval selected to provide a moisture and nitrogen content adjusted substantially biodegradable material exhibiting an initial value of biochemical oxygen demand;
transferring said material of initial value biochemical oxygen demand to a digester to provide a bulk quantity thereof supported upon a lower surface of said digester;
passing atmospheric air simultaneously through substantially all said material from said lower surface;
simultaneously agitating said material in a manner promoting generally alternating vertical movement of said bark from said lower surface to the uppermost surface of said bulk quantity as well as the migration thereof toward a location of removal from said digester positioned substantially at the center of said digester beneath said bulk quantity of material, said agitation additionally promoting a progressive dimunition of said initial value of biochemical oxygen demand, said agitation including the agitation of said bulk quantity of said bark at a position substantially over said location of removal; and
removing said migrated material of lowest value biochemical oxygen demand at said location of removal.

12. The method for treating pulp tree bark of claim 11 including the steps of:

transferring said removed migrated material of lowest value biochemical oxygen demand to a curing region;
retaining said transferred material at said curing region under ambient atmospheric conditions for an interval sufficient to effect a mesophilic phase digestion thereof; and
then transferring said mesophilic phase digested material to a receiving station.

13. The method for treating pulp tree bark of claim 11 including the step of providing a supply of alkaline material with said bark, nitrogenous material and water prior to said mixing and in an amount effective to elevate the pH thereof toward chemical neutrality.

14. The method for treating pulp tree bark of claim 11 in which said nitrogenous material is mixed with said bark in an amount sufficient to derive a carbon to nitrogen ratio by weight of said nitrogen content adjusted material of about 30 to 1.

15. The method for treating pulp tree bark of claim 11 wherein said aqueous liquid supply is provided as a sludge waste of said pulping facility.

16. The method for treating pulp tree bark of claim 11 in which said aqueous liquid is admixed with said bark and said nitrogenous material in an amount providing for a moisture content by weight of about fifty to sixty percent.

17. In a system for manufacturing paper products and the like wherein pulp tree bark is removed as a preparatory procedure to pulping and wherein a sludge categorized effluent is generated as a waste product, the improvement comprising:

receiving means for receiving said removed bark in an aerobically untreated state;
first means for providing nitrogenous material;
second means for providing an aqueous liquid;
mixing means for receiving, agitating and retaining, for a predetermined interval, said bark, said nitrogenous material and said aqueous liquid to provide a moisture and nitrogen content adjusted substantially biodegradable material;
digester means for inducing the aerobic, thermophilic phase decomposition of said biodegradable material including:
receptical means comprising elongate, spaced parallel walls and extending a predetermined height upwardly from a supporting base to a top portion for retaining a predetermined volume of said material;
means for supplying atmospheric air under pressure;
conduit means connected with said means for supplying air, positioned within said receptacle means between said parallel walls including a plurality of spaced outlets for said pressurized air, said conduit means and outlets being arranged for effecting an aerobic influence over substantially all of said material deposited within said receptacle means by air issuing from said outlets;
diffuser means positioned within said receptacle means, having an upward surface for supporting said material above said conduit means for effecting a diffusion of said air issuing from said outlets;
carriage means extending between said parallel walls and supported for movement upon said top portions;
agitator means including, rotational, auger-type agitators supported from said carriage means and moveable therewith along said receptacle means intermediate said parallel walls, each said agitator extending substantially to the upwardly disposed surface of said diffuser means, said agitators being serially disposed along with said carriage means and of number sufficient to confront substantially the entirety of said material when said carriage means is moved along the entire extent of said receptacle means and operative when rotated, to vertically elevate bark in immediate contact therewith, said agitator means and said diffused air effecting a progressive dimunition of the biochemical oxygen demand of said material;
bulk removal means including:
an elongate output receptacle open at said upward surface of said diffuser means, and substantially coextensive with and parallel to said walls;
conveyor means situated at the center of said receptacle means and within said elongate output receptacle and coextensive therewith, actuable to remove from said receptacle means said material evidencing a substantially low biochemical oxygen demand value made accessible thereto from within said receptacle means; and
slideable plate means for covering said elongate output receptacle and configured for forming an opening therein of predetermined extent over said conveyor means, said opening being progressively formable substantially along the extent of said output receptacle for providing said access of said material to such conveyor means.

18. The improved system of claim 17 wherein said mixing means is configured to retain and agitate said bark, nitrogenous material and aqueous liquid to provide a said moisture and nitrogen content adjusted material having a substantially uniform moisture content within a range of about fifty to sixty percent by weight.

19. The improved system of claim 17 in which said first means comprises a proportional feeder configured for supplying said nitrogenous material to said agitator means at a rate effective to provide a said moisture and nitrogen content adjusted material having a nitrogen content of about thirty-two percent by weight.

20. The improved system of claim 17 including: third means for providing an alkaline material to said mixing means at a rate effective to constitute said moisture and nitrogen content adjusted material as exhibiting a pH substantially approaching a value in the range of about 6 to 7.

21. The improved system of claim 17 wherein said mixing means is present as a pug mill.

22. The improved system of claim 17 wherein said mixing means is configured to retain and agitate said bark, nitrogen containing material and aqueous liquid to provide a said moisture and nitrogen content adjusted material having a substantially uniform moisture content and a carbon to nitrogen ratio by weight of about 30 to 1.

23. The improved system of claim 22 in which said mixing means is configured to retain and agitate said bark, nitrogenous material and aqueous liquid to provide a said moisture and nitrogen content adjusted material having a substantially uniform moisture content within a range of about fifty to sixty percent by weight.

24. The improved system of claim 17 including means for transferring said thermophilic phase digested material to a curing region and maintaining said material thereat within ambient environmental atmospheric conditions for an interval adequate to achieve a mesophilic phase decomposition thereof.

* * * * *